United States Patent [19]

Beato

[11] Patent Number: 5,048,096

[45] Date of Patent: Sep. 10, 1991

[54] BI-TONAL IMAGE NON-TEXT MATTER REMOVAL WITH RUN LENGTH AND CONNECTED COMPONENT ANALYSIS

[75] Inventor: Louis J. Beato, Rochester, N.Y.

[73] Assignee: Eastman Kodak Company, Rochester, N.Y.

[21] Appl. No.: 444,355

[22] Filed: Dec. 1, 1989

[51] Int. Cl.$^5$ .......................... G06K 9/46; G06K 9/34; G06K 9/40; G06K 9/66

[52] U.S. Cl. .......................................... 382/9; 382/19; 382/26; 382/54; 382/61; 358/464

[58] Field of Search ..................... 382/7, 9, 18, 19, 26, 382/28, 48, 54, 51, 61; 358/261.3, 464

[56] References Cited

U.S. PATENT DOCUMENTS

| | | | |
|---|---|---|---|
| 3,264,608 | 8/1966 | Gattner et al. | 340/146.3 |
| 3,337,766 | 8/1967 | Malaby | 315/18 |
| 3,408,485 | 10/1968 | Scott et al. | 235/92 |
| 3,885,229 | 5/1975 | Negita et al. | 340/146.3 |
| 3,967,053 | 6/1976 | Grosskopf | 178/6.8 |
| 4,020,462 | 4/1977 | Morrin, II | 340/146.3 |
| 4,045,773 | 8/1977 | Kadota et al. | 340/146.3 |
| 4,107,648 | 8/1978 | Frank | 340/146.3 H |
| 4,158,835 | 6/1979 | Miura et al. | 340/146.3 |
| 4,183,013 | 1/1980 | Agrawala et al. | 340/146.3 H |
| 4,189,711 | 2/1980 | Frank | 340/146.3 H |
| 4,251,799 | 2/1981 | Jih | 340/146.3 |
| 4,403,340 | 9/1983 | Kumpf et al. | 382/48 |
| 4,503,556 | 3/1985 | Scherl et al. | 382/48 |
| 4,504,969 | 3/1985 | Suzuki et al. | 382/10 |
| 4,504,972 | 3/1985 | Scherl et al. | 382/9 |
| 4,513,442 | 4/1985 | Scherl | 382/49 |
| 4,533,959 | 8/1985 | Sakurai | 358/280 |
| 4,547,811 | 10/1985 | Ochi et al. | 382/9 |
| 4,559,644 | 12/1985 | Kataoka et al. | 382/9 |
| 4,590,606 | 5/1986 | Rohrer | 382/7 |
| 4,624,013 | 11/1986 | Urushibata | 382/9 |
| 4,718,090 | 1/1988 | Cooper, Jr. | 382/26 |

FOREIGN PATENT DOCUMENTS

| | | |
|---|---|---|
| 55-80186 | 12/1978 | Japan . |
| 57-176484 | 4/1981 | Japan . |
| 60-77278 | 5/1983 | Japan . |
| 60-3074 | 6/1983 | Japan . |
| 60-7308 | 6/1983 | Japan . |
| 60-116076 | 11/1983 | Japan . |
| 60-200379 | 3/1984 | Japan . |
| 60-220479 | 4/1984 | Japan . |
| 61-193277 | 2/1985 | Japan . |

OTHER PUBLICATIONS

Yasuda et al., "Data Compression for Check Processing Machines," *Proceedings of the IEEE*, vol. 68, No. 7, pp. 874-885 (7/1980).

Bishop et al., "Character Recognition Approach Involving Histogram Classification", *IBM Technical Disclosure Bulletin*, vol. 21, No. 9, pp. 3461-3467, (Feb. 1979).

Kerchmar, "Amount Finding Logic," *IBM Technical Disclosure Bulletin*, vol. 15, No. 5, pp. 1531-1532 (Oct. 1972).

Nolan, "Line/Symbol Separation for Raster Image Processing," *IBM Technical Disclosure Bulletin*, vol. 15, No. 12, pp. 3879-3883 (May 1973).

Primary Examiner—David K. Moore
Assistant Examiner—Michael R. Cammarata
Attorney, Agent, or Firm—Dennis R. Arndt

[57] ABSTRACT

In processing a text image prior to optical character recognition processing, non-text graphical material is removed from the image by first discarding all lines in accordance with the length of the line and/or the percentage of black pixels in the entire pixel row (or column) in which the line is located. The line length and black pixel percentage are parameters which are traded off against one another on a sliding scale. Then, the remaining objects in the image are processed in a two-step process in which: (a) objects whose size is above a maximum threshold or below a minimum threshold are discarded and (b) individual sub-objects comprised within any of the discarded objects whose individual area and height are within threshold percentages of the median area and height of all objects in the image are restored to the image.

29 Claims, 10 Drawing Sheets

3X3 WINDOW AROUND CURRENT PIXEL

HORIZONTAL ROW RUN PROCESS

VERTICAL COLUMN RUN PROCESS

CONNECTED COMPONENT ANALYSIS PROCESS

OBJECT REMOVAL/RESTORATION ROUTINE

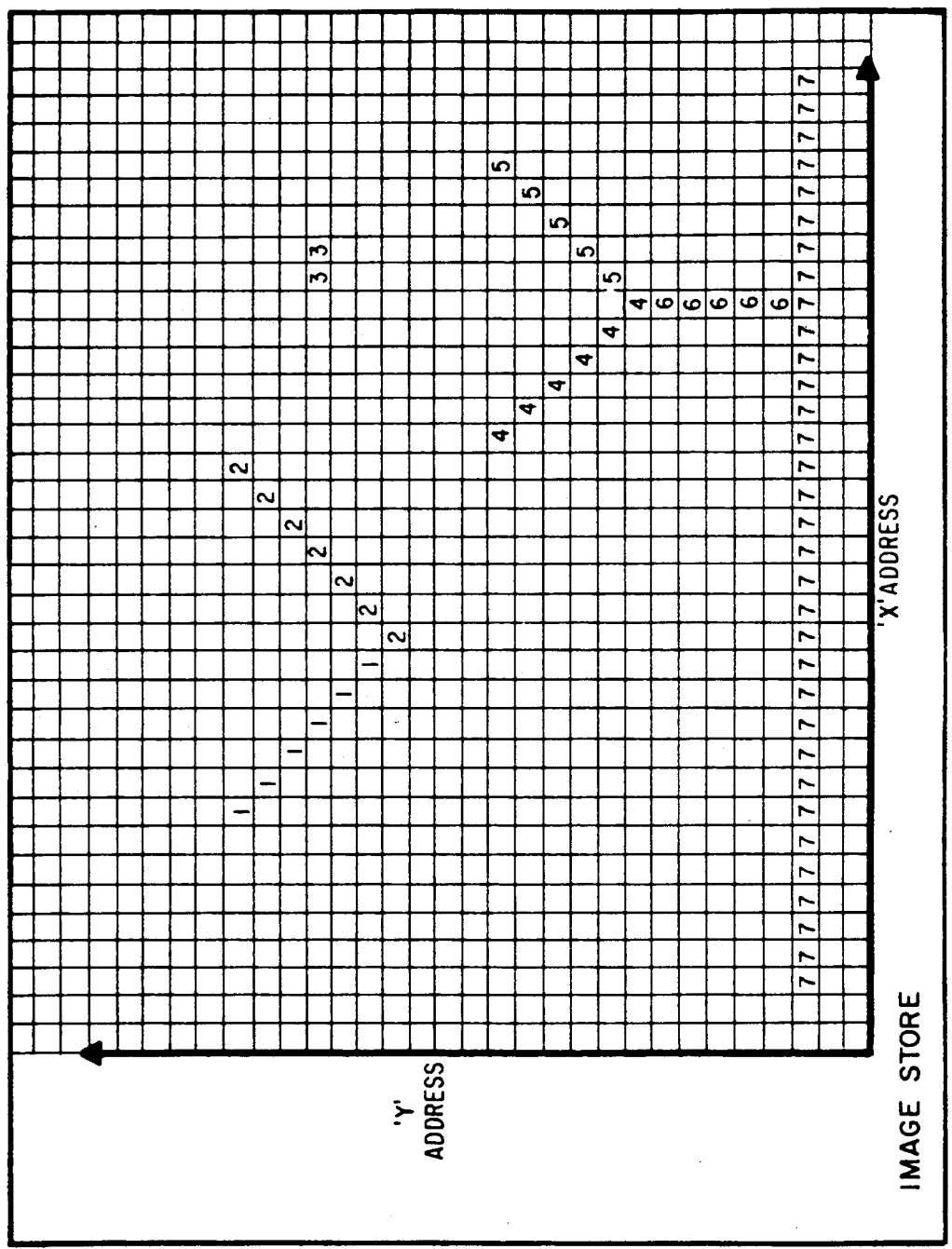

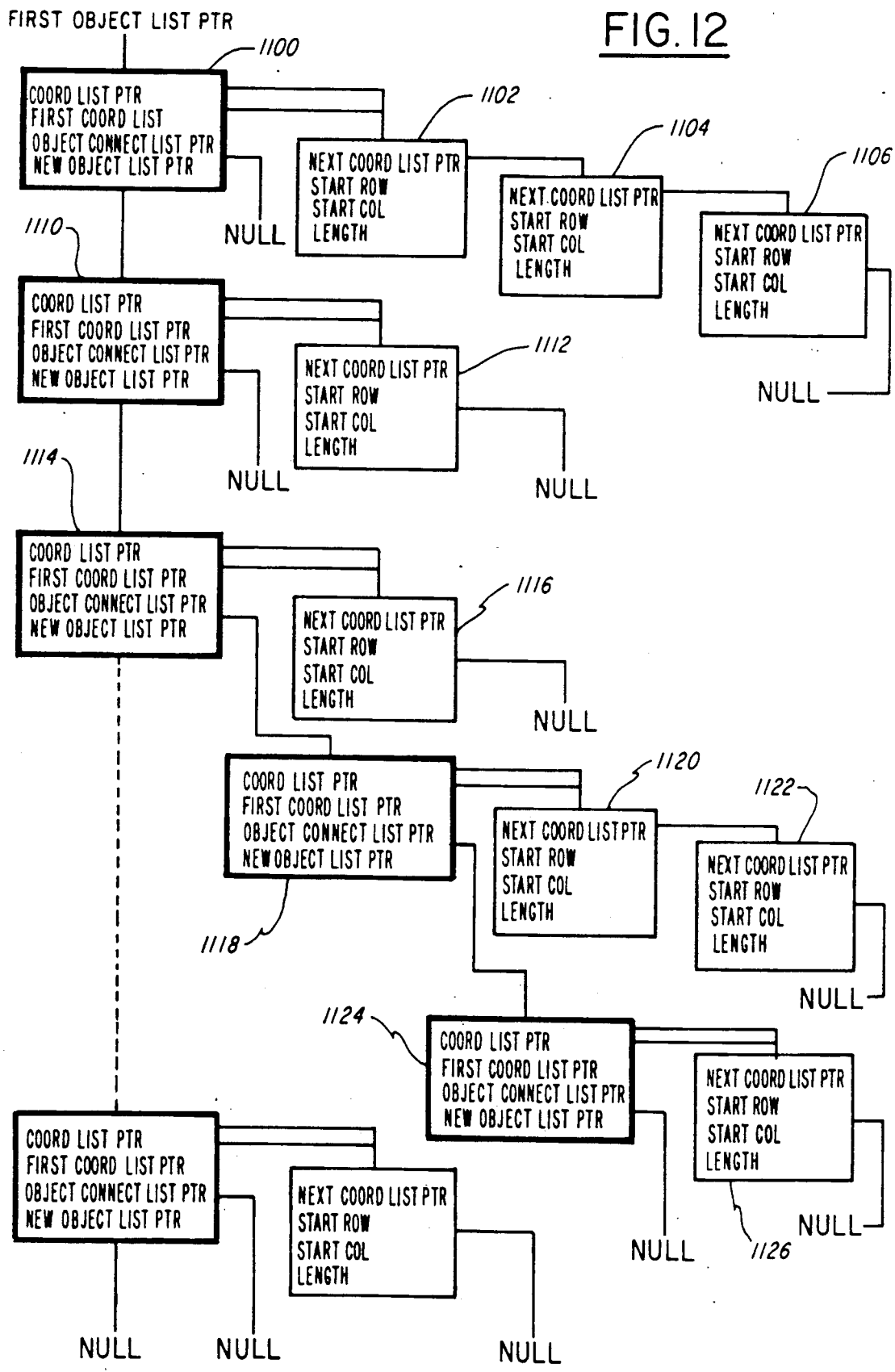

BI-TONAL IMAGE NON-TEXT MATTER REMOVAL WITH RUN LENGTH AND CONNECTED COMPONENT ANALYSIS

BACKGROUND OF THE INVENTION

1. Technical Field

The invention is related to pre-processing devices which remove non-text material from a text image for optical text character recognition systems which are capable of processing only text images.

2. Background Art

Optical character recognition (OCR) systems of the type well-known in the art digitize the image of a text document and then process the digitized image so as to deduce the identity of each character in the image, the location and identity of each character being stored in a memory. The text image may be automatically reconstructed upon demand by simply retrieving the data from the memory and printing the characters identified therein at the locations specified in the memory. Such OCR systems are capable of processing images of a predetermined set of text characters and nothing else. For this reason, documents which are to be OCR-processed must be carefully prepared to be sure that the characters on the document are all contained within the predetermined character set and that there are no other images on the document. For example, documents containing both text and graphics images tend to confuse such OCR systems. The graphical images typically include relatively long lines or curves which are unrecognizable to the OCR system. Thus, a document containing a graphical image cannot be processed by such an OCR system unless the graphical image is first removed.

There are a number of well-known methods for removing graphical or non-text images from the digitized image of a document in order to allow it to be processed by an OCR system. One type of method uses run length analysis in which the number of contiguous "on" pixels in the same row (or column) in the image is noted and used as the basis of decision-making. Such a technique is disclosed in Japanese Patent JP 61-193277 to Matsuura et al., Rohrer U.S. Pat. No. 4,590,606 and in K. Kerchmar, "Amount Line Finding Logic", *IBM Technical Disclosure Bulletin*, Volume 15, No. 5, pages 1531 to 1532 (October 1972). A related technique disclosed in Kataoka U.S. Pat. No. 4,559,644, is to low-pass filter the image data to detect long lines, which of course have a relatively low frequency content compared with text characters. A different technique is to decide whether a particular portion of the image is text or non-text graphical information based upon the number or density of black ("on") pixels in that region or line of pixels. This latter technique is disclosed in Japanese Patent No. JP 60-77278 to Isobe et al. and Japanese Patent No. JP 60-116076 to Iwase. Yet another technique is to segment the image data and decide whether each segment is text or non-text graphical information based upon the statistical properties of the segment, as disclosed in Yasuda et al., "Data Compression for Check Processing Machines", Proceedings of the IEEE, Volume 68, No. 7, pages 874 through 885 (July 1980).

Combining run length analysis with connected component analysis in a process for removing non-text graphical information from the text data of an image is disclosed in Nolan, "Line/Symbol Separation for Raster Image Processing", *IBM Technical Disclosure Bulletin*, Volume 15, No. 12 (May 1973), pages 3879 through 3883. This publication discloses a process for deciding whether a given run length of contiguous "on" pixels in the image should be classified as a graphical line to be discarded by determining whether it corresponds to a similar run length of "on" pixels in the preceding scan line which was previously identified as a graphical or non-text line.

Connected component analysis is a well-known technique used in connection with either image processing or text processing in which separately identified objects in an image are joined together as a single object whenever certain pre-determined parameters are met. This technique is disclosed in Urushibata U.S. Pat. No. 4,624,013, Japanese Patent No. JP 60-3074 to Ozawa and Frank U.S. Pat. No. 4,189,711. Connected component analysis in which the pixels of different objects are labelled with different object numbers is disclosed in Japanese Patent No. JP 60-250480 to Ninomiya et al. and Japanese Patent No. JP 60-200379 to Ariga et al. Connected component analysis and processes like it are useful for framing individual text characters in an image, as disclosed in Kumpf U.S. Pat. No. 4,403,340 and Kadota U.S. Pat. No. 4,045,773. The patent to Kadota et al. teaches discarding as noise any object whose height and width are deemed to be too small. One way in which connected component analysis is applied to separate text from non-text matter is to determine whether a length of connected "on" pixels is statistically close to a predetermined text line length, as disclosed in Scherl U.S. Pat. No. 4,513,442.

Connected component analysis is also applied in image processing of non-text or graphical images, as exemplified in the following references. Agrawala U.S. Pat. No. 4,183,013 discloses measuring the size (number of pixels) of each object and rejecting as noise those objects which are deemed to be too small. Other examples are Frank U.S. Pat. No. 4,107,648, Grosskopf U.S. Pat. No. 3,967,053 and Scott U.S. Pat. No. 3,408,485. The patent to Scott et al. teaches the technique of connected component analysis in which each object is individually numbered and may be renumbered if subsequent scanning reveals that some objects are in fact connected with one another.

The publication cited above by Nolan in the *IBM Technical Disclosure Bulletin*, while teaching the combination of run length analysis and a process like connected component analysis to remove non-text information from an image, fails to do two things. First, in performing run length analysis, none of the foregoing references recognize that a run of "on" pixels is more likely to be non-text information—regardless of its length—the higher the density of "on" pixels in its row. Instead, only the run length is measured. Secondly, there is no way in which a true text character which is actually joined to a non-text line or graphical curve can be saved upon removal of the non-text information from the image. Such characters are simply "lost", a significant problem.

Accordingly, it is an object of the invention to provide a process for removing non-text information from an image which takes into account not only the length of a run of "on" pixels but also the density of on pixels in the row (or column) of the image in which the run resides.

It is a further object of the invention to provide a process for removing non-text information from an image which restores characters joined to a graphic or non-text line which has been removed from the image.

DISCLOSURE OF THE INVENTION

The invention is an image processor which removes background non-text or graphical matter from the image of a document in preparation for optical character recognition processing of the document. In accordance with the invention, all runs of contiguous "on" pixels are analyzed in accordance with both the density of all "on" pixels in the entire row (or column) in which the run resides, as well as the length of the run itself. Specifically, either a sufficiently long run or a run residing in a row or column having a sufficient density of "on" pixels or a combination in which each requirement is lessened in proportion to the magnitude of the other on a sliding scale, results in a determination that the run is non-text material to be removed. In essence, this analysis is two-dimensional, one dimension being the run length and the other dimension being the density of "on" pixels of the entire row (or column) of pixels in the image in which the run resides.

Next, a connected component analysis is applied to the remaining image to construct all unitary objects therein. In accordance with well-known principles, some of these objects will be combinations of other individual objects which are ultimately linked together to form larger objects. The median height and area of all objects are computed. Then, those objects whose size is greater than a predetermined maximum size or less than a predetermined minimum size are deleted from the image as being unlikely candidates for text characters. This is because such text characters probably have a point size between the two extrema equal to the median height previously computed. Finally, the process inspects the deleted objects. If any of these objects were formed by linking other individual objects, such individual objects are closely analyzed. If the height and area of any of these individual objects are within predetermined thresholds of the median height and area previously computed, such individual objects are restored to the image. This latter step restores any characters which were attached in the image to rejected lines or other non-text or graphical objects, thus solving what heretofore was apparently an intractable problem for low-cost real time image preprocessors in OCR systems.

BRIEF DESCRIPTION OF THE DRAWINGS

The invention is best understood by reference to the accompanying drawings, of which:

FIG. 10 is a diagram illustrating a tutorial example of the results of a connected component analysis process;

FIG. 11 is a look-up table or list representing the object connections of FIG. 10; and FIG. 12 is a diagram of an object list map used in an alternative connected component analysis process.

MODES FOR CARRYING OUT THE INVENTION

Figure 1:
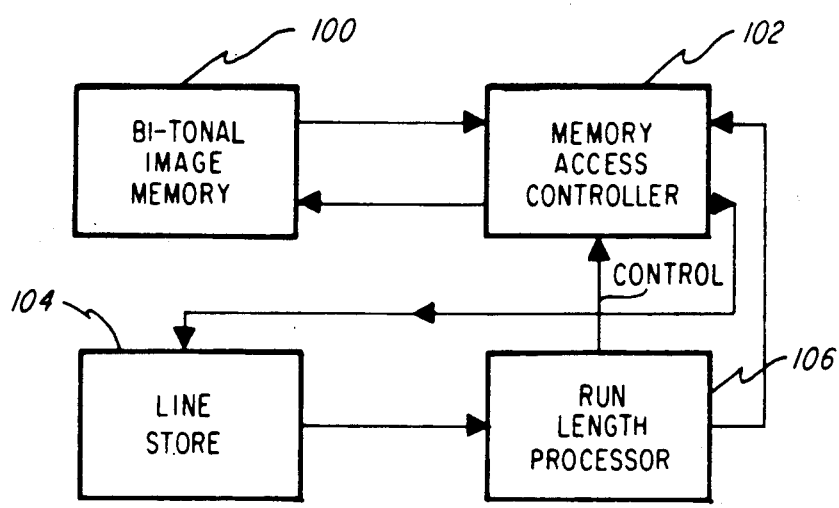
FIG. 1 is a simplified block diagram of that portion of a system embodying the invention which performs the combination run length/pixel density process.
Figure 3:
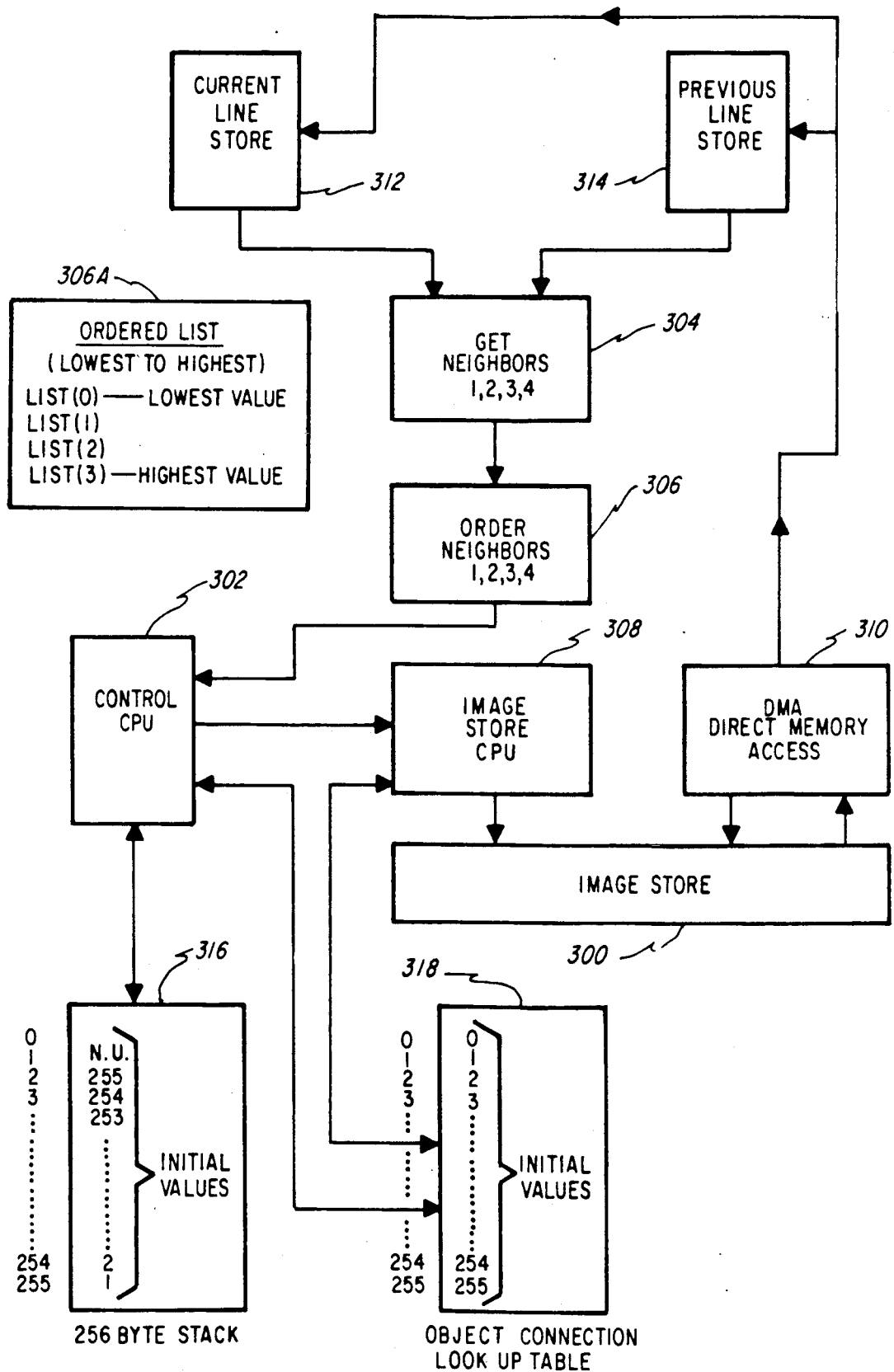
FIG. 3 is a simplified block diagram of the other portion of a system embodying the invention which performs the connected component object deletion and restoration process.
Figures 4, 5:
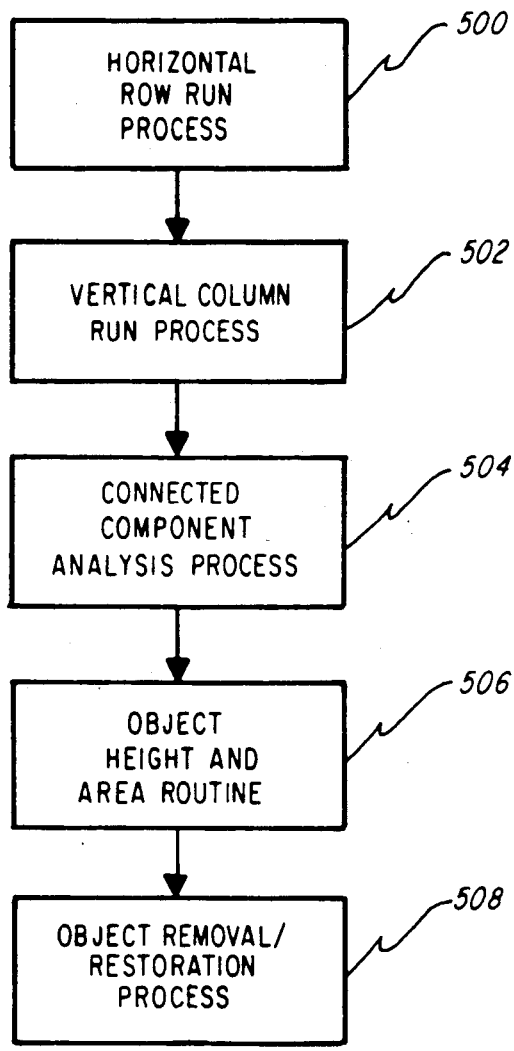
FIG. 4 is diagram of a three-by-three kernal (or window) employed by the system of FIG. 3 to process the image.
FIG. 5 is a high-level flow diagram illustrating the process performed by a system comprising the combination of the systems of FIGS. 1 and 3.

FIGS. 1 and 3 illustrate two parts of the system of the invention which removes non-text or graphical matter from the image of a document by a process illustrated in FIG. 5. The system illustrated in FIG. 1 performs the horizontal row run process and the vertical row run process which are the first two blocks of FIG. 5. The system illustrated in FIG. 3 performs the connected component analysis process, the median height and area process and the object removal and restoration process which are the last three blocks of FIG. 5.

Referring to FIG. 1, image data representing the bi-tonal image of a document which is to processed by an OCR system is stored in a bi-tonal image memory 100. Addressing and retrieving of this data in the memory 100 is controlled by a memory access controller 102 of the type well-known in the art. The image data stored in the memory 100 is organized as an array of parallel rows and parallel columns of binary bits representing pixels (picture elements) which are either "on" (black) or "off" (neutral). The controller 102 can retrieve a specific one of the rows or columns from the memory 100 and store the row (or column) of bits in a line store memory 104. A run length processor 106 processes the row (or column) of image data stored in the line store memory 104 by performing processes illustrated in FIG. 6a (in the case of a row) and FIG. 6b (in the case of a column).

Figure 2:
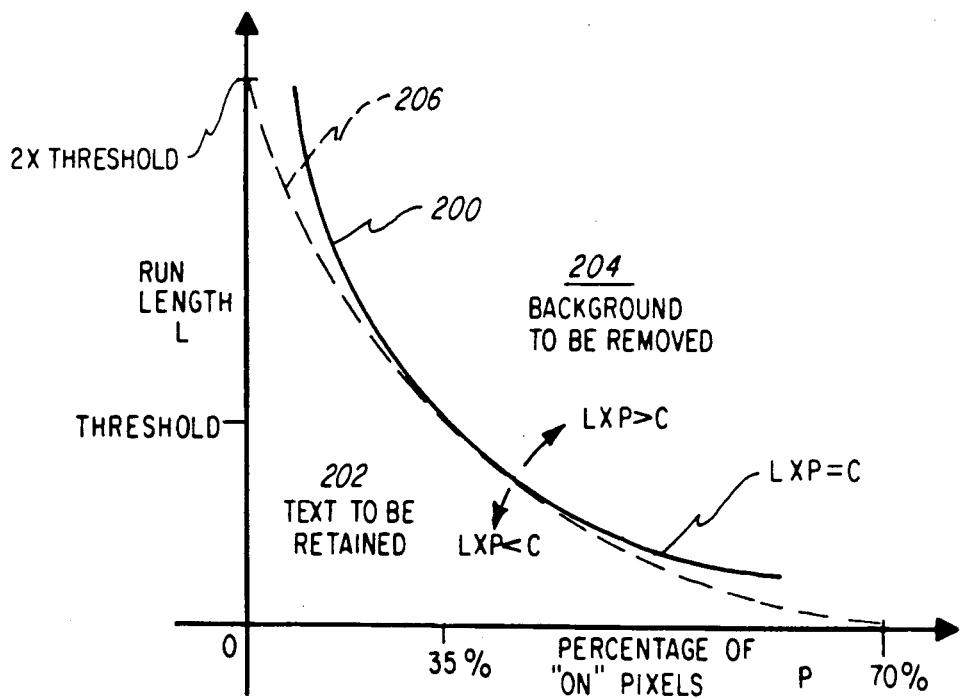
FIG. 2 is a graph depicting the two-dimensional process of FIG. 1.

FIG. 2 illustrates the principle of the processes performed by the run length processor 106 of FIG. 1. Essentially, the run length processor 106 detects each "run" of contiguous "on" pixels in the image stored in the memory 100. Such a run may lie in the vertical direction (and therefore occupy a portion of one of the columns) or lie in the horizontal direction (and therefore occupy one of the rows). In either case, the processor 106 determines whether any such run is non-text information by first noting two parameters characterizing the run: (a) the percentage of "on" pixels in the entire row (or column) in which the run resides, and (b) the actual run length (in pixels) of the run itself. These two parameters define a two-dimensional location in a plane illustrated in FIG. 2, one axis of the plane representing run length L and the other axis of the plane representing percentage P of "on" pixels in the row (or column) in which the run is located. The curve 200 in FIG. 2 separates that part 202 of the plane corresponding to text information from the remaining part 204 corresponding to non-text or graphical information. In the exemplary embodiment of FIG. 2, the curve 200 is hyperbolic and is defined by the equation $L \times P = c$, where c is a real number defining the shape of the hyperbola. In another embodiment of the invention, the curve 200 is simpler and is defined by the following criteria for deciding that a run corresponds to non-text or graphical information which must be discarded:

(1) L>threshold length and P>35%;
(2) L>2×threshold length; or
(3) P>70%, where the threshold length is a predetermined length which is greater than the maximum anticipated point size (i.e., individual character size) of the text to be processed and is the minimum line length which is to be removed. If any of these criteria is met, the run or line segment is removed.

Significantly, this embodiment enjoys several advantages, as follows. The first criteria is useful for removing dashed lines in the image. The second criteria is useful for removing random straight lines. The third criteria is useful for removing bi-tonal graphical image patterns.

This latter embodiment corresponds to the dashed-line curve 206 of FIG. 2, which intersects the vertical (L) axis at 2×threshold length, intersects the horizontal (P) axis at 70% and whose midpoint is at L=threshold length and P=35%. This analysis is performed in a horizontal row run process 500 of FIG. 5 and a vertical row run process 502 of FIG. 5.

Figure 6A:
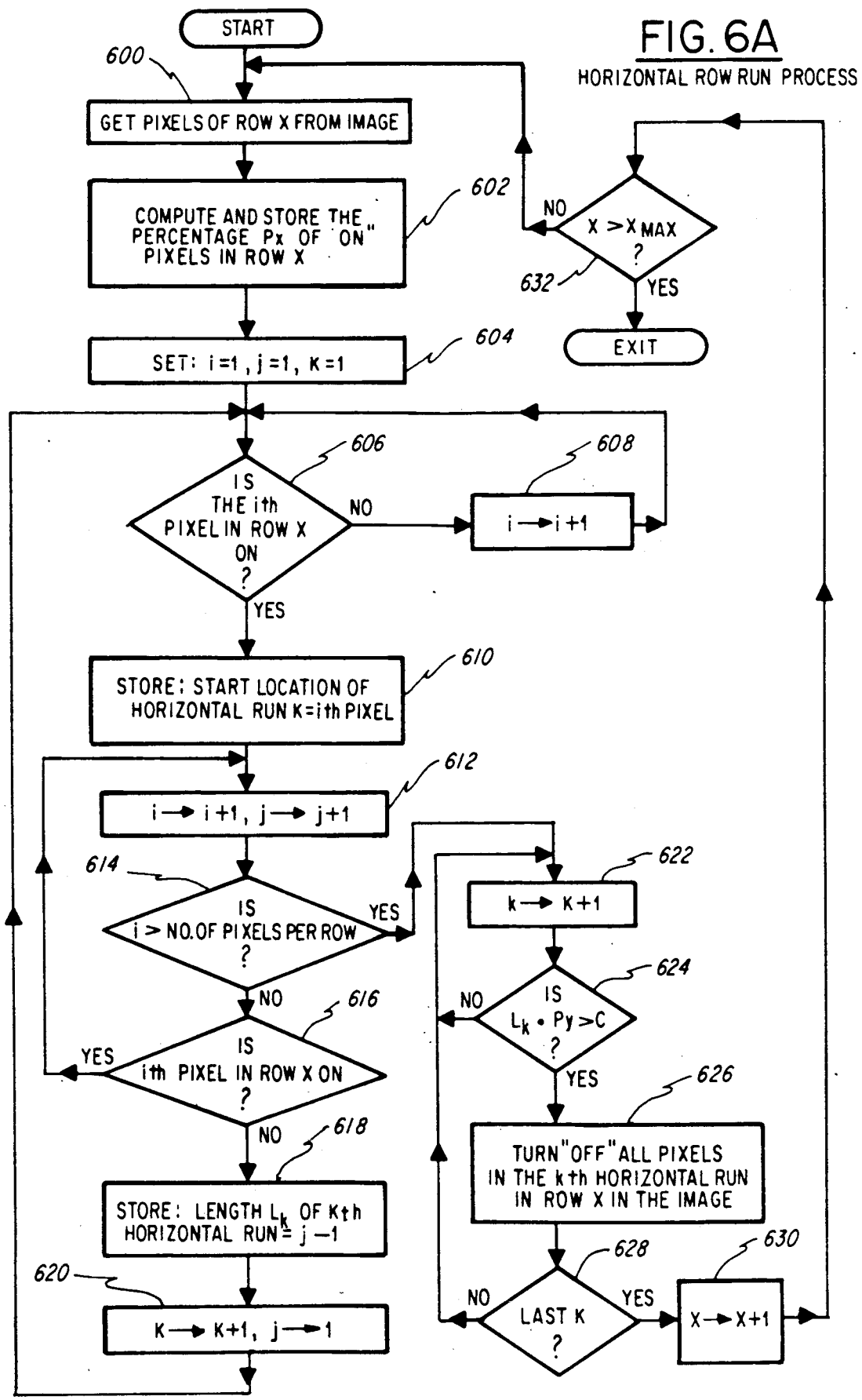
FIGS. 6a and 6b are flow diagrams illustrating the process performed by the system of FIG. 1.

The horizontal row run process 500 is illustrated in FIG. 6a and begins with the run length processor 106 instructing the controller 102 to fetch a horizontal row (i.e., row X) of pixels from the memory 100 and load it into the line store memory 104 (block 600 of FIG. 6a). Presumably, the processor 106 begins by selecting X as the first row of the image (i.e., X=1). The processor 106 counts the number of "on" pixels in row X and computes their percentage $P_x$ (block 602 of FIG. 6a). Next, three indices, i, j, k are each set to 1 (block 604). The processor 106 now determines whether the $i^{th}$ pixel in row X is on (block 606). If not ("NO" branch of block 606), the processor 106 increments the index i (block 608) and returns to block 606. On the other hand, if the $i^{th}$ pixel is found to be "on", the processor 106 assumes that a run of "on" pixels has been located. It assigns as an identifier the current value of the index k to this run and stores the current value of the index i as the horizontal start location in row X of this run (i.e., run k) in block 610 of FIG. 6a. The processor 106 now must find the end of the current run and begins its search by incrementing the indices i and j (block 612). Next, a determination is made whether the end of the current row (row X) has been reached (block 614). If not (NO branch of block 614), the processor 106 next determines whether the $i^{th}$ pixel in row X is on (block 616). If it is (YES branch of block 614), the end of the current run has not yet been found, and the processor 106 returns to block 612 and repeats the intervening steps. On the other hand, if the inquiry of block 616 determines that the $i^{th}$ pixel in row X is "off" (NO branch of block 616), the processor 106 stores the current value of the index j minus one as the location of the last pixel in the current run (block 618). Then, the index k is incremented and the index j is reset to one (block 620).

Returning to block 614, the process loop between blocks 612 and 616 continues until the end of the current row (row X) is finally reached, at which point the processor 106 takes the YES branch of block 614. At this point, the start and stop locations of all of the runs (if any) in row X have been stored and must now be analyzed. The processor 106 begins this task by resetting the run index k=1 (block 622). It then determines the length $L_k$ of run k from the difference between the stored start and stop locations of run k and then determines from the length $L_k$ of run k and from the percentage $P_x$ of "on" pixels in row X (the current row) whether run k is text or non-text matter in accordance with the graph of FIG. 2 (block 624). If this determination is made in accordance with the solid-line hyperbolic curve 200 of FIG. 2, then the determination of block 624 is simply whether the product $L_k \times P_x$ is greater than c, the hyperbolic constant characterizing the curve 200. If the run is indeed found to be non-text information, then (taking the YES branch of block 624) the processor 106 turns "off" all of the bits in the memory 100 corresponding to the pixels contained in run k (block 626). Otherwise, taking the NO branch of block 624, the processor 106 returns to block 622 and the intervening steps are repeated for the next run. Of course, if the parameters $L_k$ and $P_x$ indicate that the run is text information, no action is taken (NO branch of block 624) and the processor 106 returns to block 622 to repeat the intervening steps without deleting the pixels of the current run from the image. Eventually, it is found (block 628) that the current run is the last run found in row X (the current row). In this case, taking the YES branch of block 628, the row number X is incremented in block 630. If the last row (row $X_{max}$) in the image has already been processed (YES branch of block 632), the horizontal row run process is finished. Otherwise, (NO branch of block 632) the process returns to block 600 to process the next row of pixels in the image.

Figure 6B:
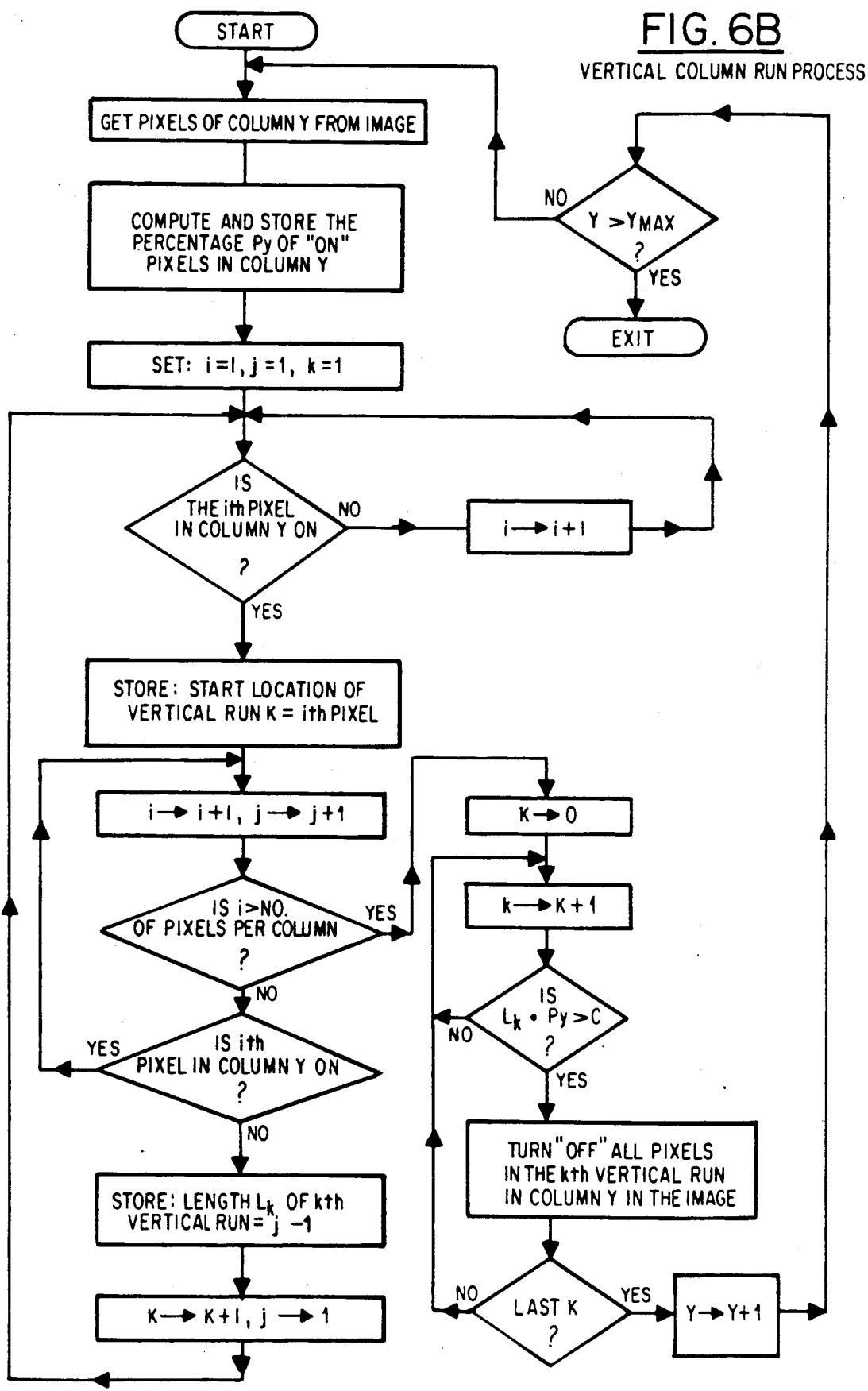

The vertical run process of FIG. 6b is the same as the horizontal run process of FIG. 6a except that, rather than fetching horizontal rows of pixels from the image memory 100, the controller 102 instead fetches successive columns starting at column location Y=1, and all references to "row" in FIG. 6a become references to "column" in FIG. 6b. Accordingly, the process of FIG. 6b need not be described further herein. Upon its completion, the connected component analysis process 504 of FIG. 5 (illustrated in FIG. 7) is begun by the system illustrated in FIG. 3.

The connected component analysis process 504 of FIG. 5 begins by transferring the contents of the image memory 100 (as modified by the horizontal and vertical run processes 500 and 502 of FIG. 5 described above in connection with FIGS. 6a and 6b) into an image store memory 300 in the system illustrated in FIG. 3. (Alternatively, the memories 100 and 300 may be the same memory shared in common by both systems portions of FIGS. 1 and 3). The structure of the system of FIG. 3 will now be described.

Figure 7:
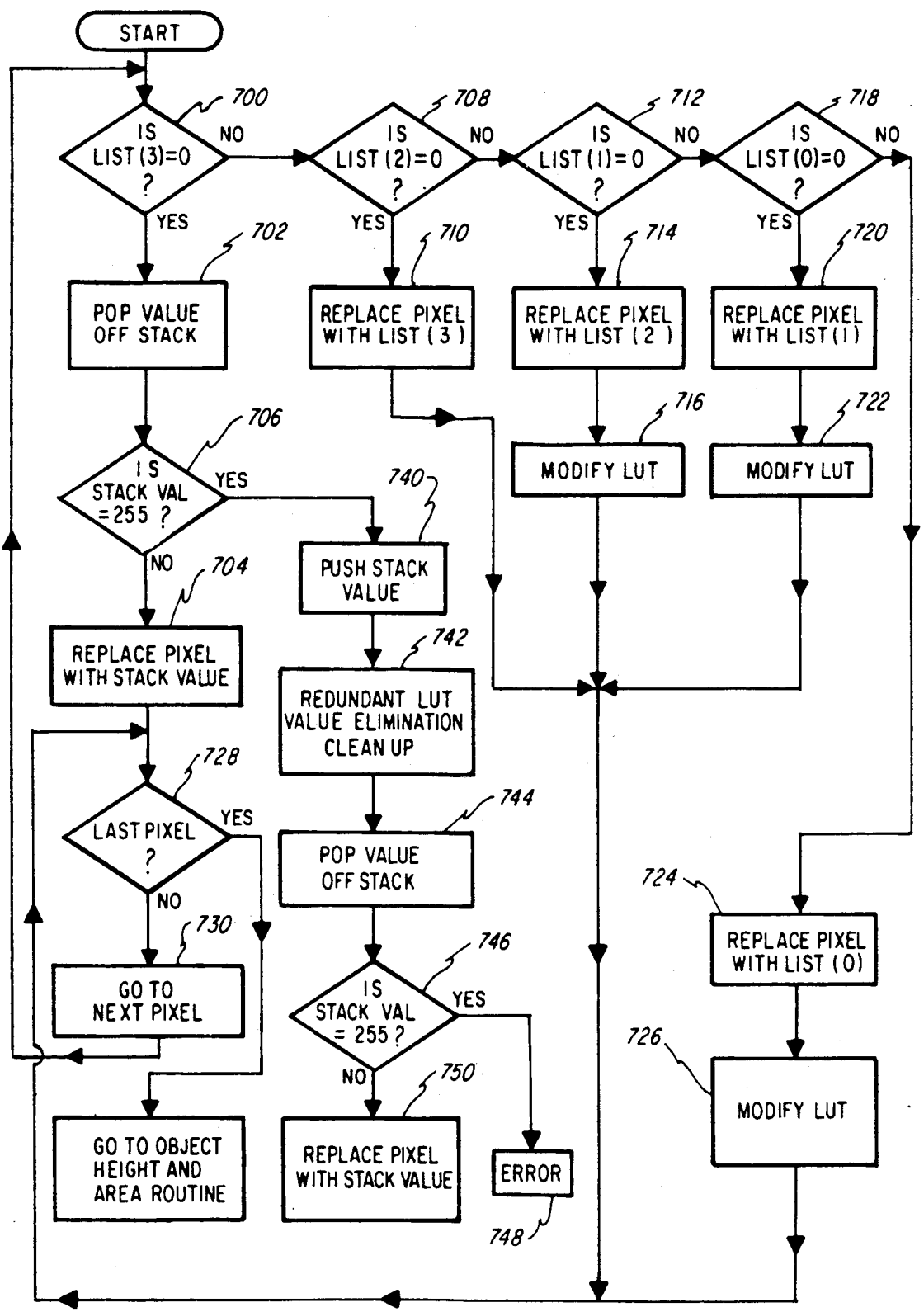
FIG. 7 is a flow diagram illustrating one embodiment of the connected component analysis process performed by the system of FIG. 3.

A control processor 302 manages the execution of the processes of FIG. 7 by controlling an image processing window device 304, an image processing ordering device 306 and an image store processor 308. The image store processor 308 controls the image store memory 300 as well as a direct memory access (DMA) controller 310 connected to the image store memory 300. The DMA controller 310 fetches successive rows of pixels from the image store memory 300 and stores them in a current line store memory 312 and a previous line store memory 314. The control processor 302 assigns to monolithic objects detected in the image successive object values or numbers in an order determined by a byte stack in a byte stack memory 316. Any interconnection of such objects which forms a larger object is recorded by the image store processor 308 in a look-up table which correlates the object values of connected objects to one another.

In essence, the control processor 302 causes a window of neighboring pixels (illustrated in FIG. 4) adjacent the current pixel of interest to be analyzed in a manner to be described below. This analysis is performed by the window device 304, the ordering device 306 and the control processor 302 itself. If such analysis determines that some of these pixels are part of a new object, the processor 302 causes the value of those pixels in the memory 300 to be changed from their binary "on" value to the next object value furnished by the stack memory 316. On the other hand, if the current pixel is found to be connected to a previously formed object, its value in the memory 300 is changed to the value of the previously formed object. Finally, if the analysis determines that two previously formed objects are really connected to one another (to form a larger object), the look-up table 318 is modified by the image store processor to indicate that the object values of the two objects are correlated either to each other or to the object value of the larger object. The window may be thought of as being moved to frame a new pixel in the memory 300 each time the foregoing operation is performed, until all of the pixels have been thus analyzed. The result is that all pixels in the memory 300 which are part of an object have their value changed from their binary "on" value (e.g., 1) to the appropriate object value. The memory 300 is thus transformed to an object map.

Each pixel is represented by a binary one-bit word in the bi-tonal image memory 100 of FIG. 1, must be represented by a multi-bit word in the image store memory 300 of FIG. 3 in order to allow that word to be increased to a number as great as the maximum number of objects anticipated to be in the image. For example, if as many as 254 objects are anticipated, then eight bits must be allocated to each pixel in the image store memory 300. Initially, each pixel in the image store memory 300 starts out as either binary 0 ("off") or 1 ("on"). However, any of the binary 1 pixels may be changed to any value between 2 and 255, depending upon which object (if any) it is found to be connected to and depending upon how many objects are discovered in the image. The foregoing process will now be described in greater detail by reference to FIG. 7.

The control processor, 302, through the image store processor 308, causes successive horizontal rows of pixels from the image store memory 300 to be successively loaded into the current line store memory 312, previous rows therein being displaced to the previous line store memory 314. Thus, the current line store memory 312 contains the current row while the previous line store memory 314 contains the previous row of pixels. The window device 304 creates the movable "window" of FIG. 4 by taking each pixel in the current line store one at a time (e.g., from left to right in the image) and fetching the four closest neighboring pixels which have already been processed (i.e., those pixels labelled 1, 2, 3 and 4 in the "window" of FIG. 4). The ordering device 306 then inspects the value of the four neighboring pixels and lists these pixels (by their location or address in the image store memory 300) in ascending order of their values in a list 306a. The list 306a is used by the control processor 302 to perform the connected component analysis process of FIG. 7 for the current pixel framed by the window of FIG. 4. Then, the "window" is in effect "moved" to the right by the window device 304 fetching the neighbors of the next pixel in the current line store memory 312, and the foregoing steps are repeated. This process continues until the "window" of FIG. 4 has been scanned across every pixel in the image stored in the memory 300. It should be noted that any pixels centered in the "window" of FIG. 4 which are found to be "off" are simply skipped over.

The diagram of FIG. 7 begins at a point in time at which the "window" of FIG. 4 overlies a current pixel of interest which is "on" (i.e., has a binary value of 1 or greater). The window device 304 fetches the four neighbors (in accordance with the four neighbor locations indicated in FIG. 4) and the ordering device 306 numbers the four neighbors of the current pixel in ascending order of value from 0 to 3 to form the ordered list 306a. (Of course, at the very beginning of this process, no pixel values have been changed to object values and therefore each pixel has a value of either 0 or 1.) The processor 302 determines whether the value of pixel 0 on the list 306a is 0 (block 700 of FIG. 7). If so, all of the neighbors are off (their values are all 0) so that the current pixel of interest is unconnected to any previous pixels or objects and therefore deserves a new object number. In this case, taking the YES branch of block 700, the next object value is taken off the stack in the byte stack memory 316 (block 702) and replaces the value of the current pixel in the image store memory 300 (block 704). Preferably, the byte stack memory 316 furnishes in descending order successive eight bit object value bytes beginning at 256 and ending at 1. If the last value of the stack (i.e., 1) has already been used, a determination (block 706) to this effect prevents further object values from being assigned, in a manner to be discussed below herein. This event preferably is prevented from occurring by selecting a sufficiently long word to represent each pixel in the image store memory 300. As mentioned above, this length is 8 bits in the embodiment described herein.

Returning to block 700, if the value in the image store memory 300 of pixel 3 of the ordered list 306a is not 0 (NO branch of block 700), then the current pixel is connected to at least one pixel—i.e., pixel number 0 of the ordered list—which has been previously processed and which therefore previously has been assigned an object value from the byte stack memory 316. Since pixel number 3 of the ordered list 306a may not be the only one to which the current pixel is connected, further inquiries must be made. The next one (following the NO branch of block 700) is to determine whether pixel number 2 of the ordered list 306a has value 0 in the image store memory 300 (block 708). If it is of value 0, then there can be no further neighboring pixels to which the current pixel is connected (due to the ordered nature of the list 306a). Therefore, the only connection is to the previous neighboring pixel on the ordered list 306a (i.e., pixel number 3). Accordingly, taking the NO branch of block 708, the value of the current pixel (now framed in the center of the "window" of FIG. 4) is changed in the image store memory 300 by the image store processor 308 to the object value previously assigned to pixel number 3 of the ordered list 306a (block 710).

The process becomes noticeably more intricate if subsequent ones of the neighboring pixels on the ordered list are non-zero. Starting with pixel number 2 of the ordered list 306a, a non-zero pixel value causes the control processor 302 to take the NO branch of block 708 to block 712, in which an inquiry is made as to whether the value in the image store memory 300 of the next pixel (pixel number 1 of the ordered list) is zero. If it is, then (taking the YES branch of block 712) there are no further pixels on the ordered list 306a to which the current pixel is connected (given the ordered nature of the list 306a) and therefore the value of the current pixel must be changed in the image store memory 300 to the value of the last non-zero pixel of the ordered list-namely, pixel number 2 (block 714). However, the two non-zero pixels of the ordered list 306a (i.e., numbers 3 and 2 of the ordered list) may have previously been assigned different object values in the image store memory 300. In such a case, their common connection was not discovered until reaching the current pixel now framed in the middle of the movable window of FIG. 4. For example, the current pixel may be the center pixel connecting the two arms of the letter V, as illustrated in FIG. 10. In the example of FIG. 10, the pixels of one arm have been assigned the object value 11 while the pixels of the other arm have been assigned the object value 12 (only the last digit of each of the object values 11 and 12 are indicated in FIG. 10). In the present case, the connection between these two object values must now be established. This is accomplished in block 716 by modifying the contents of the object connection look-up table 318 so that the address byte 11 is associated with the look-up data byte 12, for example. (Of course, the look-up table 318 is initialized prior to the commencement of the entire process by indicating no connections, so that each address byte is associated with a look-up data byte of the same value.)

The same type of steps as those described above following the NO branch of block 708 are now followed from the NO branch of block 712 if the value in the image store memory 300 of the next pixel of the ordered list 306a—pixel number 1—is not zero. This commences with the determination (block 718) of whether the value in the memory 300 of pixel number 0 of the ordered list 306a is 0. This is followed by the steps of blocks 720 and 722 following the YES branch of block 718. These latter steps correspond to those of blocks 714 and 716, respectively, described above in connection with the YES branch of block 712. In block 720, the value in the memory 300 of the current pixel is changed to that of pixel number 1 of the ordered list. In block 722 the look-up table 318 is modified to indicate a connection between the object values on the ordered list 306a by virtue of their connection through the current pixel. The reasoning behind these steps has already been explained in connection with blocks 714 and 716, respectively, and need not be repeated here. Finally, the NO branch of block 718 is taken if all of the neighboring pixels in the window of FIG. 4 are non-zero. In this case all of the pixels are connected to form a single object to which the current pixel is also connected. Thus, the value of the current pixel is replaced (block 724) in the image store memory 300 with the object value previously assigned to pixel number 0 on the ordered list constructed by the ordering device 306. Since the current pixel now connects pixel numbers 1 and 0 of the ordered list 306a, the look-up table is modified (block 726) to indicate the connection between the object values of pixel numbers 1 and 0 of the ordered list.

Each one of the YES branches of blocks 708, 712, 718 and the NO branch of block 718 ultimately leads to block 728, in which it is determined whether the last pixel in the image has been processed. If not, taking the NO branch of block 728, the window of FIG. 4 is moved to frame the next pixel in the image (block 730) and the control processor repeats the foregoing connected component analysis beginning with block 700. Otherwise, taking the YES branch of block 728, all pixels in the image have been processed and so the connected component analysis process of FIG. 7 is finished. The next process, namely the object height and area computation process 506 of FIG. 5, is now begun. This process is illustrated in greater detail in FIG. 8.

Before progressing to the object height and area computation process, the connected component analysis process of FIG. 7 will be explored in the case in which there are more objects in the image than there are values in the byte stack memory or more than $2^n$, where n is the number of bits per pixel in the image store memory 300. In the present case, $n=8$, and so block 706 makes this determination by asking whether the last object value furnished by the stack is 255. Taking the YES branch of block 706, this value is returned to the byte stack memory 316 (block 740) and the redundant object values are noted by inspecting the look-up table 318 to see if there are any objects comprising several other objects with different object values connected together. If so, the look-up table 318 is "cleaned up" (block 742), meaning that object values associated with an object comprising other objects with different object numbers connected together in the look-up table 318 are converted in the image store memory 300 to the same object number, and the remaining object values in the look-up table associated with this object are returned to the byte stack memory, as being no longer associated with the object. Returning these object values to the byte stack memory 316 makes them available to label new objects, thus increasing the number of objects which may be processed, a significant advantage. The only drawback to this technique is that the identity of the separate sub-objects connected together to form the one object is lost forever. As will be seen later, this identity must be retained if the object removal and restoration process is to succeed in returning to the image text characters which are connected to discarded non-text lines.

After the look-up table has been cleaned up in block 42, one of the new object values is popped off the byte stack in the byte stack memory 316 (block 744). If this value is equal to 255 (block 746), an error is declared (block 748). Otherwise, the new object value is used to replace the value of the current pixel (block 750) as was earlier attempted in block 702, and the process continues with the step of block 728 as previously described. However, as discussed above, it is preferable to not use the foregoing "clean-up" technique, and instead provide enough bytes per pixel in the image store memory 300 to be able to process as many objects in the image as necessary without reaching the end of the byte stack in the byte stack memory 316.

Figure 8:
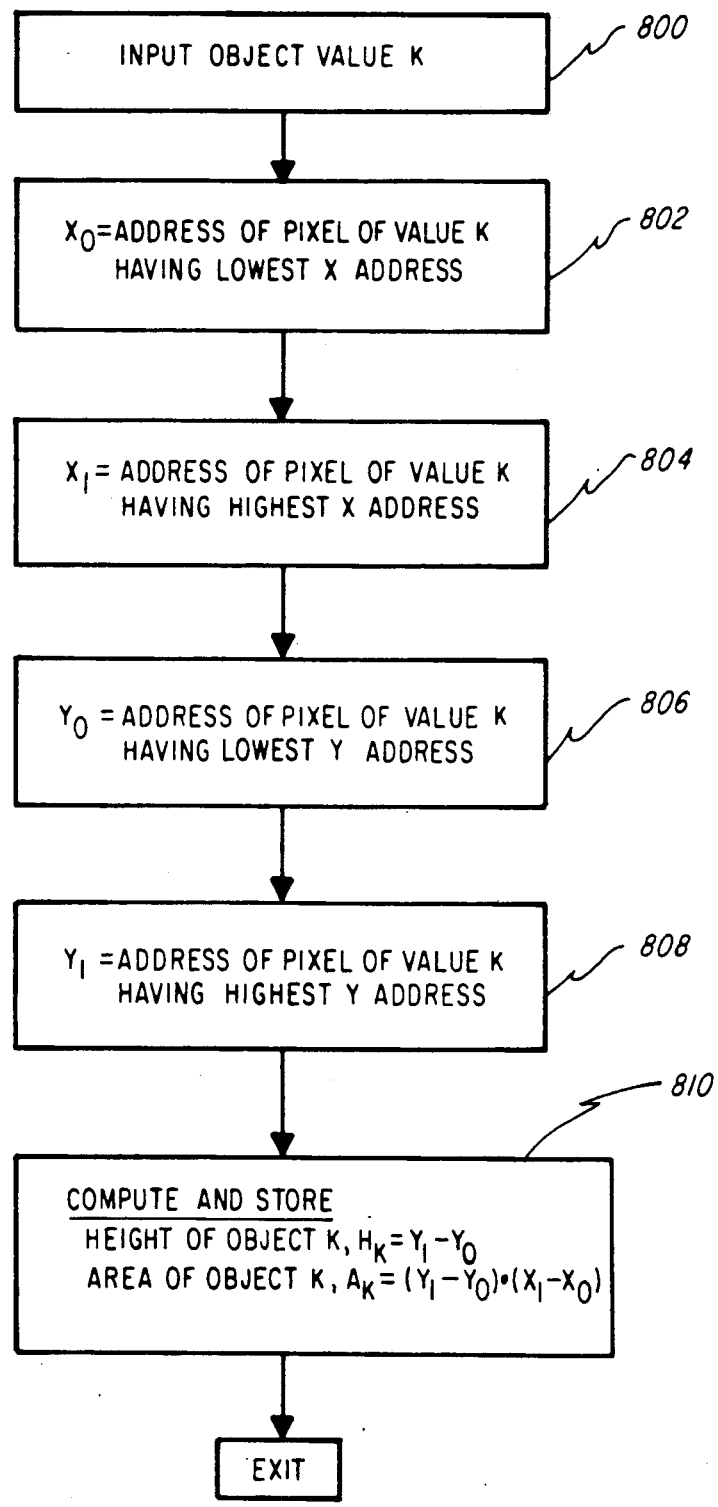
FIG. 8 is a flow diagram illustrating the computation by the system of FIG. 3 of the height and area of an object formed in the process of FIG. 7.

FIG. 8 illustrates how the results of the connected component analysis stored in the image store memory 300 are used to compute the height and area of each object. From this, the median height and median area of all objects found in the image are computed using the well-known definition of a median value. Referring now to the computation of the height and area of an individual object shown in FIG. 8, the object value k assigned to the object is entered. Typically, we start at some initial value of k, for example $k=1$, and perform the process of FIG. 8, increment k and repeat the process of FIG. 8 until the height and area of all objects have been computed and stored.

For each object value k (block 800), all pixels in the image store memory having the object value k and all pixels having other object values are connected in the look-up table with the object value k are now considered together. (The image store memory 300 is considered to be an X-Y addressable random access memory of the type well-known in the art, wherein each location is specified by a Y address and an X address.) Of these pixels, the address or location in the memory of the pixel having the lowest X address is stored as $X_0$ (block 802), while the address of the pixel having the highest X address is stored at $X_1$ ((block 804). Also, of these same pixels (i.e., those pixels having or connected to the object value k) the address of the pixel having the lowest Y address is stored as $Y_0$ (block 806), while the address of the pixel having the highest Y address is stored as $Y_1$ (block 808). The height $H_k$ of object k is computed as $Y_1-Y_2$, while the area $A_k$ of object k is computed as $H_k \times (X_1-X_0)$ in block 810. Once the height and area of all objects have been thus computed and stored, the control processor 302 begins the object removal and restoration process 508 of FIG. 5 illustrated in FIG. 9.

Figure 9:
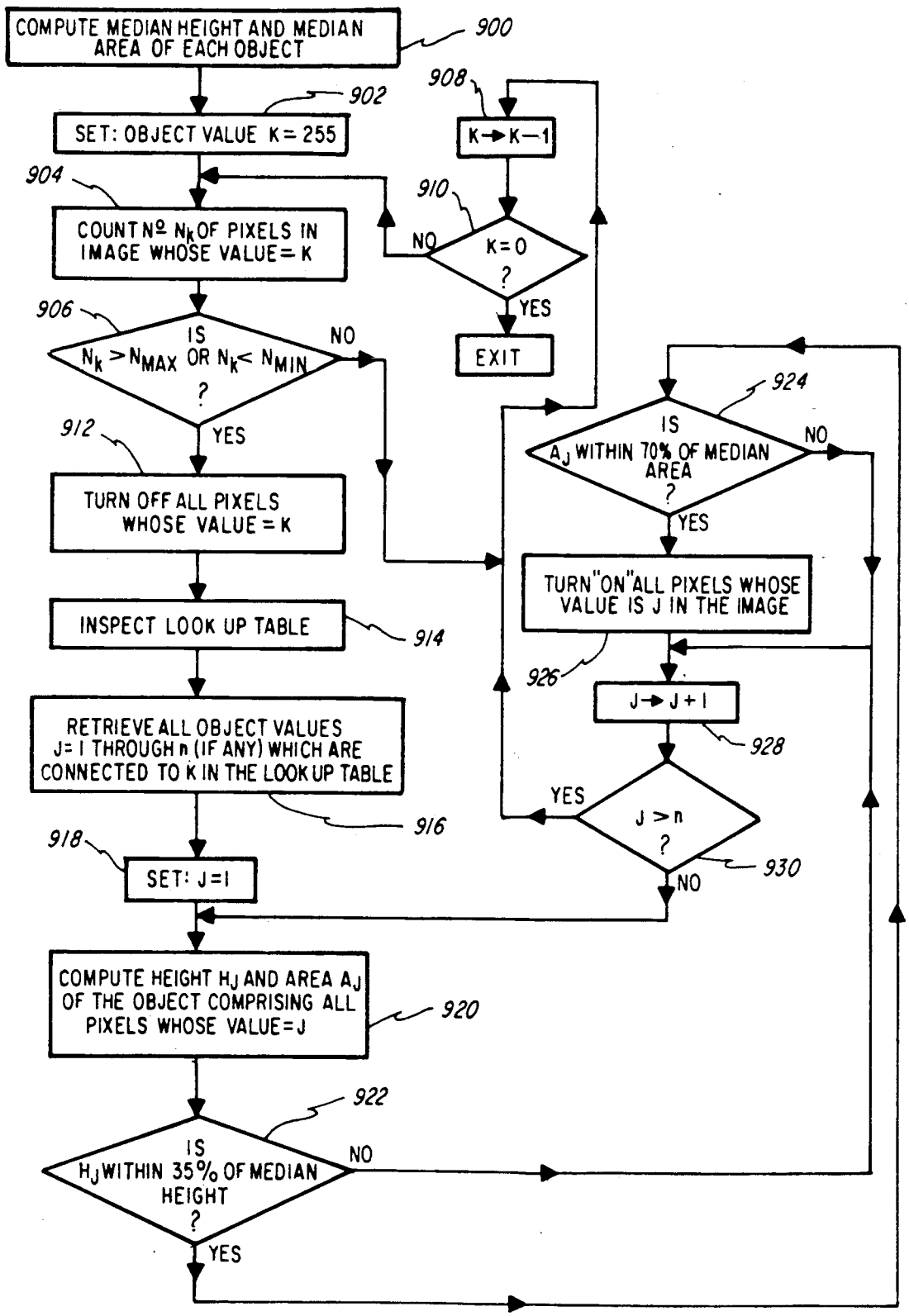
FIG. 9 is a flow diagram illustrating the object removal and restoration process of the invention.

Referring to the process of FIG. 9, the control processor 302 first computes the median height and median area of all objects in the image from the individual heights and areas, respectively, previously computed and stored by the process of FIG. 8, in accordance with the well-known definition of median value (block 900 of FIG. 9).

Next, the object value index k is set to an initial value (such as 255) in block 902 and the processor 302 counts the number $N_k$ of pixels in the image store memory 00 having the assigned object value k or whose object value is connected in the look-up table 318 with the object value k (block 904). Next a determination is made whether $N_k$ exceeds a predetermined maximum $N_{max}$ or is less than a predetermined minimum $N_{min}$ (block 906). If not, the number of pixels is deemed to be within the bounds of a text character and no action is taken. In this case, taking the NO branch of block 906, the object index k is decremented to the next value (block 908), a determination is made whether the last object has been analyzed (block 910) and (if not) taking the NO branch of block 910, the processor 302 returns to block 904.

If on the other hand the determination of block 906 finds that $N_k$ is beyond the predetermined bounds, object k is deemed to be non-text matter and all of the pixels having the value k in the memory 300 or whose object values are connected in the look-up table 318 with the object value k are turned off (changed to 0 value) in the image store memory 300 (block 912).

Now the processor 302 begins the object restoration process. It retrieves all of the objects (if any) whose pixels were turned off in block 912 by virtue of having object values connected in the look-up table 318 to the object value k (blocks 914 and 916). Each of these objects (hereinafter referred to as "sub-objects") is assigned a temporary index J beginning at J=1 and ending at J=n, depending upon how many sub-objects there are. The index J is then initialized to J=1 (block 918) and the height $H_J$ and area $A_J$ of sub-object J is computed using the object height and area computation process described above in connection with FIG. 8 (block 920). If $H_J$ is within a predetermined percentage (block 922) of the median height previously computed in block 900 and if $A_J$ is within 70% (block 924) of the median area previously computed in block 900, then the pixels of sub-object J are restored (turned back "on") in the image store memory 300 (block 926). Following either the NO branches of blocks 922 or 924 or following the step of block 926, the index J is incremented (block 928). If this is not the last value of J, then, following the NO branch of block 930, the process returns to block 920 and the intervening steps are performed for the next sub-object J. Otherwise, following the YES branch of block 930, the process returns to the step of block 908 and the entire process of FIG. 9 is repeated for the next full object k.

FIG. 10 illustrates an example demonstrating the benefits of the object restoration process described above. FIG. 11 illustrates the contents of the object connection look-up table 318 of FIG. 3 corresponding to the example of FIG. 10. In this example, the letter Y, consisting of three connected objects comprising pixels having three respective object values 4, 5 and 6 is connected at its bottom to as straight line consisting of pixels having the object value 7. The object values 4, 5 and 6 would be connected together as a single object which is later connected to the line of object value 7. Object values 4, 5 and 6 would therefore be connected in the object connection look-up table 318 (FIG. 3), as illustrated in FIG. 11. The cumulative object comprising object numbers 4 through 7 is initially discarded. Then, the object restoration process finds the sub-object (comprising object values 4, 5 and 6) and restores it to the image if the letter Y is within the prescribed range of the median height and area.

The threshold run length of FIG. 2 as well as the minimum and maximum object sizes $N_{min}$ and $N_{max}$ of FIG. 9 are selected in accordance with the point size of the characters which are anticipated to be on the document to be processed. For example, the threshold run length is the minimum size of lines which are to be deleted from the image and should be significantly longer than the height of the highest character in the character set present on the document or the width of the widest character. Likewise, the maximum and minimum object sizes $N_{max}$ and $N_{min}$ should be significantly larger and smaller, respectively, than the largest and smallest characters in the character set present on the document. As one example, $N_{max}$ may be selected as $10 \times$ number of pixels scanned along one inch and $N_{min}$ as $0.1 \times$ number of pixels scanned along one inch, a choice which depends upon the typical character size of the characters on the document to be processed. Presumably, in most cases an object such as object number 3 in FIG. 10 consisting of only two pixels falls well below the minimum size criteria and is therefore deleted.

A computer program written in "C" language embodying the concept of the above-described invention is attached to the end of this specification as Appendix A. In this program, software equivalents to the hardware of FIG. 3 were employed which utilize the memory of the computer running the program. Specifically, rather than storing an eight-bit object value for each pixel in the image store memory 300 of FIG. 3 to represent object connectivity, an object list map or memory data structure illustrated in FIG. 12 is employed in the program of Appendix A. As shown in FIG. 12, this map starts with "First Object List Pointer" which is the location in memory of the first object 1100. The object 1100 is a space in the computer's memory allocated to a corresponding object in the image. This memory space contains a coordinate list pointer, which is the memory location of object segments 1102, 1104 and 1106 connected to the object 1100. Each segment 1102, 1104, 1106 is yet another space in the memory of the computer running the program and contains the starting row number and column number in the image of the corresonding segment or run of contiguous "on" pixels in the image, the length of the run and a Next Coordinate List Pointer, which points to the location in memory of the next one of the segments (1102, 1104, 1106). The object 1100 further contains a First Coordinate List Pointer, which points to the location in memory of the first segment connected to the object 1100, namely the segment 1102. Finally, the object 1100 contains a New Object List Pointer, which points to the location in memory of the next separate object, namely the object 1110. In similar fashion, the object 1110 comprises a segment 1112 and is followed by another separate object 1114 comprising a segment 1116. The object 1114 is connected to two other distinct objects, namely object 1118 (comprising segments 1120 and 1122) and object 1124 (comprising segment 1126). The objects 1118 and 1124 are thus sub-objects of the larger object 1114 to which they are connected. Such sub-objects have been discussed above in relation to the object removal and restoration process of FIG. 9.

While the invention has been described in detail by specific reference to preferred embodiments thereof, it is understood that variations and modifications thereof may be made without departing from the true spirit and scope of the invention.

```
#include <stdio.h>
#include "remove.h"
/***********************************************************************
 *****·********************************************************************
 ***********************************************************************
 ***                                                               ***
 ***                                                               ***
 ***   MODULE TITLE: LineRemoval_Runl                              ***
 ***   AUTHOR:    LOU BEATO                                        ***
 ***                                                               ***
 ***   PURPOSE:  The purpose of this module is to perform a Connected  ***
 ***             Component Analysis of the input image segmenting character  ***
 ***             and background information.                       ***
 ***                                                               ***
 ***   PROCEDURES:                                                 ***
 ***          RELATIVE   |                                         ***
 ***          POSITION IN |                                        ***
 ***          LISTING     | PROCEDURE HIERARCHY                    ***
 ***                                                               ***
 ***                     |                                         ***
 ***             1  | ObjectDetection                              ***
 ***             E  |   PutSeqLine                                 ***
 ***             E  |   malloc                                     ***
 ***             3  |   CompareCurrentAndPrevious                  ***
 ***             4  |     CreateNewObject                          ***
 ***             5  |     AddToExistingObject                      ***
 ***             9  |     OrderObjectPtrList                       ***
 ***             6  |     ConnectTwoObjects                        ***
 ***             E  |   CloseFile                                  ***
 ***             7  |   DisplayResults                             ***
 ***            11  |     GetObjectParams                          ***
 ***            10  |     OrderList                                ***
 ***             8  |     DeleteObject                             ***
 ***             E  |   SaveLineBuffer                             ***
 ***                |                                              ***
 ***             2  | InitObjectRecognition                        ***
 ***             E  |   free                                       ***
 ***             E  |   malloc                                     ***
 ***             E  |   InitLineRemoval                            ***
 ***             E  |   OpenWriteFile                              ***
 ***                |                                              ***
 ***                |                                              ***
```

```
    ***                                                            ***
    ************************************************************************
    ************************************************************************
    ***********************************************************************/
#define DPI 400
define MAXOBJECTS 10000 static char  WriteName[30]= "PreLineRemoval.bin";
static int   WriteFileNumber = 19;
static int   ObjectCount, NumberOfObjectsDeleted;

BOOLEAN DEBUG;

struct ObjectList  {
                struct CoordList  *CoordListPtr;
                struct CoordList  *FirstCoordListPtr;
                /* Points to next object connection */
                struct ObjectList *ObjectConnectListPtr;

/* Points to next object */
                struct ObjectList *NextObjectListPtr;
                /* Points to previous object */
                struct ObjectList *PrevObjectListPtr;

int   NumberOfPixels;
                short int   Height;
                short int   Width;
                long  int   Area;
                float PixelPercent;
                float HeightWidthRatio;
            };

struct CoordList   {
                struct CoordList *NextCoordListPtr;
                short int StartRow;
                short int StartCol;
                short int Length;
            };

struct RunningList {
                struct ObjectList *ObjectListPtrHead;
                short int StartRow;
                short int StartCol;
                short int Length;
                struct RunningList *NextRunningListPtr;
            };

struct ObjectList  *FirstObjectListPtr = NULL;
struct ObjectList  *LastObjectListPtr;
struct ObjectList  *ObjectListPtr;
struct RunningList *FirstPrevRunningListPtr;
struct RunningList *FirstCurRunningListPtr;
static struct ObjectList  *ObjectPtr[4400];
static int    Height[MAXOBJECTS];
static int    Width [MAXOBJECTS];
static int    TotalNumberOfObjectsCounter;
static short int Row, Col;
```

```
static struct RunningList *PrevRunningListPtr;
static struct RunningList *CurRunningListPtr;
static int    RecordLength;
```

```
/***************************************************************************
 *                                                                         *
 *   PROCEDURE TITLE:  ObjectDetection                                     *
 *                                                                         *
 *   AUTHOR: LOUIS J. BEATO                                                *
 *   DATE:   10/29/87                                                      *
 *                                                                         *
 *   MODIFICATION HISTORY:                                                 *
 *                                                                         *
 *   PURPOSE: The purpose of this procedure is to search each line looking *
 *            for pixels.                                                  *
 *                                                                         *
 *   CALLING SEQUENCE: ObjectDetection (LineBufPtr,                        *
 *                                     LineWidth,                          *
 *                                     J,                                  *
 *                                     startline,                          *
 *                                     startcol);                          *
 *                                                                         *
 *   OPERATIONAL DETAILS: Each segment is recorded and after the line is   *
 *                        finished, it is compared with the previous line. *
 *                        If there is segment overlap, the approriate      *
 *                        function is called.                              *
 *                                                                         *
 ***************************************************************************/
ObjectDetection (LineBufPtr, LineWidth, NumberOfLines, startline, startcol)
BOOLEAN *LineBufPtr[4400];
int LineWidth, startline, startcol, NumberOfLines;
{
int    Count;
BYTE ObjectCounter;
BOOLEAN Pixel;
int    StartRow, StartCol, Length;
int    I;
int    MedianHeight;

for (Row = 0; Row < NumberOfLines; Row++)
   {
      if ((Row % 100) == 0)
         printf ("%d Rows processed\n",Row);

PutSeqLine (LineBufPtr[Row],
              RecordLength,
              WriteFileNumber);
      Col = 0;

CurRunningListPtr = (struct RunningList *)
              malloc (sizeof (struct RunningList));
      if (CurRunningListPtr == NULL)
         printf ("NULL pointer received.\n");

FirstCurRunningListPtr = CurRunningListPtr;
      CurRunningListPtr->NextRunningListPtr = NULL;
```

```
while (Col < LineWidth)
{
   /* Neighbor List is an ordered list of the values of the
   neighbors of the pixel in question. */

Pixel = LineBufPtr[Row][Col];
   if (Pixel != 0)
   {
      StartRow = Row;
      StartCol = Col;
      Length = 0;
      Col++;
      /* Start Counting pixels in this line */
      while ((Pixel != 0) && (Col <= LineWidth))
      {
         Pixel = LineBufPtr[Row] [Col++];
         Length++;
      }
      Col--; /* Re adjust Col */
      /* Save run length data */
      CurRunningListPtr->StartRow = StartRow;
      CurRunningListPtr->StartCol = StartCol;
      CurRunningListPtr->Length  = Length;
      /* Setup allocation for the next area to be used */
      CurRunningListPtr->NextRunningListPtr = (struct RunningList *)
                     malloc (sizeof (struct RunningList));
      if (CurRunningListPtr->NextRunningListPtr == NULL)
         printf ("NULL pointer received.\n");

CurRunningListPtr = CurRunningListPtr->NextRunningListPtr;
      CurRunningListPtr->NextRunningListPtr = NULL;
   }
   Col++;
}
/* OK Now this Row is finished... process the data */
/* We will check to see if we need to do one of the following:
   1) Create new object
   2) Add to existing object
   3) Merge two or more objects
*/
/* Fix pointer so they point to the head of the list */

CurRunningListPtr = FirstCurRunningListPtr;
/* Look through the Current running list and determine if
the run length is part of an object */ while (CurRunningListPtr->NextRunningListPtr != NULL)
{
   CompareCurrentAndPrevious (FirstPrevRunningListPtr,
                  CurRunningListPtr);
   /* Point to next node in the list */
   CurRunningListPtr = CurRunningListPtr->NextRunningListPtr;
}

/* free up storage allocation for Running List
free (PrevRunningListPtr); */
```

```
/* Replace the Previous Running List Pointer with the Current
   Running List Ptr */

FirstPrevRunningListPtr = FirstCurRunningListPtr;
}
CloseFile (&WriteFileNumber);

DisplayResults(FirstObjectListPtr,
           LineBufPtr);
printf ("NumberOfObjects deleted was %d\n",NumberOfObjectsDeleted);

for (Count = 0; Count < Row; Count++)
    SaveLineBuffer (Count + startline,
              LineBufPtr[Count],
              LineWidth,
              startcol);

}
```

```
/**************************************************************************
 *                                                                        *
 *   PROCEDURE TITLE: InitObjectRecognition                               *
 *                                                                        *
 *   AUTHOR: LOUIS J. BEATO                                               *
 *   DATE:   10/29/87                                                     *
 *                                                                        *
 *   MODIFICATION HISTORY:                                                *
 *                                                                        *
 *   PURPOSE: The purpose of this procedure is to setup the variables for *
 *            this module.                                                *
 *                                                                        *
 *   CALLING SEQUENCE: InitObjectRecognition (RecLength)                  *
 *                                                                        *
 *   OPERATIONAL DETAILS: Initialize the Height, Width, and ObjectPtr     *
 *                  arrays to NULL (0). Free up any used space in the     *
 *                  linked lists if possible. Init the Current and        *
 *                  previous RunningLists to NULL. Call                   *
 *                  InitLineRemoval and Open the PreLineRemoval.bin       *
 *                  file.                                                 *
 *                                                                        *
 **************************************************************************/
InitObjectRecognition(RecLength)
int  RecLength;
{
int I;
struct RunningList *RunningListPtr, *TempRunningListPtr;
struct ObjectList  *ObjectListPtr, *TempObjectListPtr;

printf ("\nObject Segmentation...\n");

TotalNumberOfObjectsCounter = 0;

NumberOfObjectsDeleted = 0;

RecordLength = RecLength;
```

```
   for (I = 0; I < 4400; I++)
      ObjectPtr[I] = NULL;
   for (I = 0; I < sizeof(Height)/sizeof(int); I++)
      Height[I] = 0;
   for (I = 0; I < sizeof(Width)/sizeof(int); I++)
      Width[I] = 0;

/* We want to free any used space */

/**************************
   ObjectListPtr = FirstObjectListPtr;
   while (ObjectListPtr != NULL)
   {
      TempObjectListPtr = ObjectListPtr->NextObjectListPtr;
      VAX - FREE doesn't seem to work properly for some images.

TempConnectionListPtr = ObjectListPtr->ObjectConnectionListPtr;
      ObjectList->CoordListPtr = ObjectListPtr->FirstCoordListPtr;
      while (ObjectListPtr->CoordListPtr != NULL)
      {

TempCoordListPtr = ObjectListPtr->FirstCoordListPtr;
         free(ObjectListPtr
      }
      free(ObjectListPtr);
      ObjectListPtr = TempObjectListPtr;
   }
   RunningListPtr = FirstPrevRunningListPtr;
   while (RunningListPtr != NULL)
   {
      TempRunningListPtr = RunningListPtr->NextRunningListPtr;
      free(RunningListPtr);
      RunningListPtr = TempRunningListPtr;
   }

RunningListPtr = FirstCurRunningListPtr;
   while (RunningListPtr != NULL)
   {
      TempRunningListPtr = RunningListPtr->NextRunningListPtr;
      free(RunningListPtr);
      RunningListPtr = TempRunningListPtr;
   }
**************************/

PrevRunningListPtr = NULL;
   FirstPrevRunningListPtr = PrevRunningListPtr;

FirstObjectListPtr = NULL;
   ObjectListPtr = NULL;

PrevRunningListPtr = (struct RunningList *)
               malloc (sizeof (struct RunningList));
   if (PrevRunningListPtr == NULL)
      printf ("NULL pointer received.\n");

FirstPrevRunningListPtr = PrevRunningListPtr;
   PrevRunningListPtr->NextRunningListPtr = NULL;
```

```
    ObjectCount = I = Row = 0;

InitLineRemoval(RecLength);

OpenWriteFile (&WriteFileNumber, WriteName, &RecLength);
}

/***************************************************************************
 *                                                                          *
 *   PROCEDURE TITLE: CompareCurrentAndPrevious                             *
 *                                                                          *
 *   AUTHOR: LOUIS J. BEATO                                                 *
 *   DATE:   10/29/87                                                       *
 *                                                                          *
 *   MODIFICATION HISTORY:                                                  *
 *                                                                          *
 *   PURPOSE: The purpose of this procedure is to compare the current line  *
 *            and the previous line to look for segment connections.        *
 *                                                                          *
 *   CALLING SEQUENCE: CompareCurrentAndPrevious (FirstPrevRunningListPtr,  *
 *                                  CurRunningListPtr);                     *
 *                                                                          *
 *   OPERATIONAL DETAILS: Check the PrevRunningListPtr, if it is NULL then  *
 *                  we are on the first line. If not, Count how many        *
 *                  objects connect to the Current object.                  *
 *                       0 - Create New Object                              *
 *                           Add to Existing Object                         *
 *                       1 - Add to Existing Object                         *
 *                       2 - Merge Coordinates of Object 2 with Object 1    *
 *                       3 ... - Connect each object with the first         *
 *                                                                          *
 ***************************************************************************/
CompareCurrentAndPrevious (PrevRunningListPtr,
                CurRunningListPtr)
register struct RunningList *PrevRunningListPtr, *CurRunningListPtr;
{
register struct   RunningList *RunningListPtr, *RunningPtr;
register struct   ObjectList *Object1Ptr, *Object2Ptr, **StartObjectPtr=ObjectPtr;
register struct   ObjectList *TempObjectPtr;
register int      ObjectCounter, Count;
struct   CoordList    *CoordListPtr;
struct   ObjectList   *Ptr;

if (PrevRunningListPtr->NextRunningListPtr == NULL)  /* FirstLine */
    {
       CreateNewObject();

AddToExistingObject (ObjectListPtr,
                   CurRunningListPtr->StartRow,
                   CurRunningListPtr->StartCol,
                   CurRunningListPtr->Length);
       CurRunningListPtr->ObjectListPtrHead = ObjectListPtr;
    }
    else
    {
```

```
ObjectCounter = 0;
RunningListPtr = PrevRunningListPtr;
while (RunningListPtr->NextRunningListPtr != NULL)
{
    if ((CurRunningListPtr->StartCol >= RunningListPtr->StartCol - 1 &&
         CurRunningListPtr->StartCol <= RunningListPtr->StartCol +
                            RunningListPtr->Length)    ||
        (CurRunningListPtr->StartCol +
         CurRunningListPtr->Length    >= RunningListPtr->StartCol &&
         CurRunningListPtr->StartCol  <= RunningListPtr->StartCol +
                            RunningListPtr->Length))
    {
        /* We must have overlap and therefor merger
        so we will keep track of how many objects are connected here*/
        /* This statement will fill the ObjectPtr array */
        *StartObjectPtr++ = RunningListPtr->ObjectListPtrHead;
        ObjectCounter++;
    }
    RunningListPtr = RunningListPtr->NextRunningListPtr;
}
if (ObjectCounter == 0)
{ /* Does not connect to any objects */

CreateNewObject();
    AddToExistingObject (ObjectListPtr,
                CurRunningListPtr->StartRow,
                CurRunningListPtr->StartCol,
                CurRunningListPtr->Length);
    CurRunningListPtr->ObjectListPtrHead = ObjectListPtr;
}
else if (ObjectCounter == 1)
{ /* Connects only to one object */
    AddToExistingObject (ObjectPtr[0],
                CurRunningListPtr->StartRow,
                CurRunningListPtr->StartCol,
                CurRunningListPtr->Length);
    CurRunningListPtr->ObjectListPtrHead = ObjectPtr[0];
    ObjectPtr[0] = NULL;
}
else if (ObjectCounter == 2)
{ /* Connects to two or more objects */
    /* Add to the first object and then determine connection */
    if (ObjectPtr[0] != ObjectPtr[1])
    {
        OrderObjectPtrList (ObjectPtr,
                    ObjectCounter);

/* We want to move the coordinates from the second object
        to the first */
        ObjectPtr[0]->CoordListPtr->NextCoordListPtr =
            ObjectPtr[1]->FirstCoordListPtr;
        ObjectPtr[0]->CoordListPtr =
            ObjectPtr[1]->CoordListPtr;

/* Need to get ObjectPtr[1] out of the main object list */
```

```
            AddToExistingObject (ObjectPtr[0],
                    CurRunningListPtr->StartRow,
                    CurRunningListPtr->StartCol,
                    CurRunningListPtr->Length);
            CurRunningListPtr->ObjectListPtrHead = ObjectPtr[0];

/* Need to find who is pointing to Object[1] ************/
            Ptr = ObjectPtr[1]->PrevObjectListPtr;
            if (Ptr != NULL)
                Ptr->NextObjectListPtr = ObjectPtr[1]->NextObjectListPtr;

Ptr = ObjectPtr[1]->NextObjectListPtr;
            /* if Ptr is == NULL that means ObjectPtr[1] was the end of the
            list */
            if (Ptr != NULL)
                Ptr->PrevObjectListPtr = ObjectPtr[1]->PrevObjectListPtr;
            /***********************************************************/

/* Need to adjust the ObjectList PTr so it points to the end
            of the list */
            if (ObjectPtr[1] == LastObjectListPtr)
            {
                LastObjectListPtr = ObjectPtr[1]->PrevObjectListPtr;
                ObjectListPtr = LastObjectListPtr;
            }

/* Need to update the previous running list to change ObjectListPtrHead
            that points to PTR2 to point to PTR1 */
            RunningPtr = FirstPrevRunningListPtr;
            while (RunningPtr->NextRunningListPtr != NULL)
            {
                if (RunningPtr->ObjectListPtrHead == ObjectPtr[1])
                    RunningPtr->ObjectListPtrHead = ObjectPtr[0];
                RunningPtr = RunningPtr->NextRunningListPtr;
            }

/* Need to update the current running list to change ObjectListPtrHead
            that points to PTR2 to point to PTR1 */
            RunningPtr = FirstCurRunningListPtr;
            while (RunningPtr->NextRunningListPtr != NULL)
            {
                if (RunningPtr->ObjectListPtrHead == ObjectPtr[1])
                    RunningPtr->ObjectListPtrHead = ObjectPtr[0];
                RunningPtr = RunningPtr->NextRunningListPtr;
            }
            ObjectPtr[0] = NULL;
            ObjectPtr[1] = NULL;
        }
        else
        {
            AddToExistingObject (ObjectPtr[0],
                    CurRunningListPtr->StartRow,
                    CurRunningListPtr->StartCol,
                    CurRunningListPtr->Length);
            CurRunningListPtr->ObjectListPtrHead = ObjectPtr[0];
            ObjectPtr[0] = NULL;
            ObjectPtr[1] = NULL;
```

```
            }
         }
         else
         {  /* Connects to three or more objects */
            /* Add to the first object and then determine connection */
            OrderObjectPtrList (ObjectPtr,
                        ObjectCounter);
            AddToExistingObject (ObjectPtr[0],
                        CurRunningListPtr->StartRow,
                        CurRunningListPtr->StartCol,
                        CurRunningListPtr->Length);
            CurRunningListPtr->ObjectListPtrHead = ObjectPtr[0];
            StartObjectPtr = &ObjectPtr[1];
            while ( *StartObjectPtr != NULL)
            {
               ConnectTwoObjects (ObjectPtr[0],
                        *StartObjectPtr,
                        ObjectCounter);
               *StartObjectPtr++ = NULL;
            }
            ObjectPtr[0] = NULL;
         }
      }
   }
```

```
/******************************************************************
 *                                                                *
 *   PROCEDURE TITLE: CreateNewObject                             *
 *                                                                *
 *   AUTHOR: LOUIS J. BEATO                                       *
 *   DATE:   10/29/87                                             *
 *                                                                *
 *   MODIFICATION HISTORY:                                        *
 *                                                                *
 *   PURPOSE: The purpose of this procedure is to Create a New Object *
 *            structure.                                          *
 *                                                                *
 *   CALLING SEQUENCE: CreateNewObject()                          *
 *                                                                *
 *   OPERATIONAL DETAILS: Allocate storage for new object and assign *
 *                default values.                                 *
 *                                                                *
 *                                                                *
 ******************************************************************/
CreateNewObject ()
{
struct ObjectList *PrevObjectListPtr;

/* Save the previous object list ptr */
   PrevObjectListPtr = ObjectListPtr;
   ObjectListPtr = (struct ObjectList *) malloc (sizeof (struct ObjectList));

if (ObjectListPtr == NULL)
         printf ("NULL pointer received.\n");

LastObjectListPtr = ObjectListPtr;
```

```
    ObjectListPtr->NextObjectListPtr = NULL;
    ObjectListPtr->PrevObjectListPtr = PrevObjectListPtr;

if (PrevObjectListPtr != NULL)
        PrevObjectListPtr->NextObjectListPtr = ObjectListPtr;

if (FirstObjectListPtr == NULL)
        FirstObjectListPtr = ObjectListPtr;

ObjectListPtr->ObjectConnectListPtr = NULL;

ObjectListPtr->FirstCoordListPtr = NULL;

ObjectCount++;
}

/****************************************************************
 *                                                              *
 *  PROCEDURE TITLE: AddToExistingObject                        *
 *                                                              *
 *  AUTHOR: LOUIS J. BEATO                                      *
 *  DATE:   10/29/87                                            *
 *                                                              *
 *  MODIFICATION HISTORY:                                       *
 *                                                              *
 *  PURPOSE: This procedure adds the passed data to the desired ObjectList.*
 *                                                              *
 *  CALLING SEQUENCE: AddToExistingObject (ObjectPtr[0],        *
 *                                         StartRow,            *
 *                                         StartCol,            *
 *                                         Length);             *
 *                                                              *
 *  OPERATIONAL DETAILS:                                        *
 *                                                              *
 ****************************************************************/
AddToExistingObject (ObjectListPtr,
                     StartRow,
                     StartCol,
                     Length)
struct ObjectList *ObjectListPtr;
int    StartRow, StartCol, Length;
{
struct CoordList *NextCoordListPtr;

if (ObjectListPtr->FirstCoordListPtr == NULL)
    {
        ObjectListPtr->CoordListPtr =
            (struct CoordList *) malloc (sizeof (struct CoordList));

if (ObjectListPtr->CoordListPtr == NULL)
            printf ("NULL pointer received.\n");

ObjectListPtr->FirstCoordListPtr = ObjectListPtr->CoordListPtr;

ObjectListPtr->CoordListPtr->StartRow = StartRow;
        ObjectListPtr->CoordListPtr->StartCol = StartCol;
        ObjectListPtr->CoordListPtr->Length   = Length;
```

```
        ObjectListPtr->CoordListPtr->NextCoordListPtr = NULL;
   }
   /* Not the first time */
   else
   {
      /* Need to remember the current coordinate list pointer */
      ObjectListPtr->CoordListPtr->NextCoordListPtr =
            (struct CoordList *) malloc (sizeof (struct CoordList));

if (ObjectListPtr->CoordListPtr->NextCoordListPtr == NULL)
         printf ("NULL pointer received.\n");

ObjectListPtr->CoordListPtr =
         ObjectListPtr->CoordListPtr->NextCoordListPtr;
      ObjectListPtr->CoordListPtr->StartRow = StartRow;
      ObjectListPtr->CoordListPtr->StartCol = StartCol;
      ObjectListPtr->CoordListPtr->Length   = Length;

ObjectListPtr->CoordListPtr->NextCoordListPtr = NULL;
   }
}

/****************************************************************************
*                                                                           *
*   PROCEDURE TITLE: ConnectTwoObjects                                      *
*                                                                           *
*   AUTHOR: LOUIS J. BEATO                                                  *
*   DATE:   10/29/87                                                        *
*                                                                           *
*   MODIFICATION HISTORY:                                                   *
*                                                                           *
*   PURPOSE: The purpose of this procedure is to Connect two objects by     *
*            using the ConnectionListPtr in the ObjectList.                 *
*                                                                           *
*   CALLING SEQUENCE: ConnectTwoObjects (Object1Ptr,                        *
*                                        Object2Ptr,                        *
*                                        ObjectCounter);                    *
*                                                                           *
*   OPERATIONAL DETAILS: Check to see if the two objects are the same. If   *
*                        they are, do nothing. If not, Go to the end of the *
*                        connection list and attach Object2Ptr. Now fix     *
*                        the ObjectList to reflect that Object2Ptr was      *
*                        removed.                                           *
*                                                                           *
****************************************************************************/
ConnectTwoObjects(Object1Ptr,
               Object2Ptr,
               ObjectCounter)
struct ObjectList *Object1Ptr;
struct ObjectList *Object2Ptr;
int    ObjectCounter;
{
struct ObjectList *Ptr, **TempObjectPtr;
struct ObjectList *ConnectionPtr;
struct RunningList *RunningPtr;
int    Count;
```

```
/* Ig the two objects are the same... do not do anything */ if (Object1Ptr != Object2Ptr)
{
    /* If the second object is the start of the list,
       swap the two pointers so everything is OK */
    if (Object2Ptr == FirstObjectListPtr)
    {
        Ptr = Object1Ptr;
        Object1Ptr = Object2Ptr;
        Object2Ptr = Ptr;
    }

/* Need to look for the end of the connection */
    ConnectionPtr = Object1Ptr;
    while (ConnectionPtr->ObjectConnectListPtr != NULL)
        ConnectionPtr = ConnectionPtr->ObjectConnectListPtr;
    /* Now attach the latest object */
    ConnectionPtr->ObjectConnectListPtr = Object2Ptr;

/* Need to find who is pointing to Object2 */
    Ptr = Object2Ptr->PrevObjectListPtr;
    if (Ptr != NULL)
        Ptr->NextObjectListPtr = Object2Ptr->NextObjectListPtr;
    Ptr = Object2Ptr->NextObjectListPtr;

/* if Ptr is == NULL that means Object2Ptr was the end of the list */
    if (Ptr != NULL)
        Ptr->PrevObjectListPtr = Object2Ptr->PrevObjectListPtr;

/* Need to adjust the ObjectList PTr so it points to the end
       of the list */
    if (Object2Ptr == LastObjectListPtr)
    {
        LastObjectListPtr = Object2Ptr->PrevObjectListPtr;
        ObjectListPtr = LastObjectListPtr;
    }

/* Need to update the previous running list to change ObjectListPtrHead
       that points to PTR2 to point to PTR1 */
    RunningPtr = FirstPrevRunningListPtr;
    while (RunningPtr->NextRunningListPtr != NULL)
    {
        if (RunningPtr->ObjectListPtrHead == Object2Ptr)
            RunningPtr->ObjectListPtrHead = Object1Ptr;
        RunningPtr = RunningPtr->NextRunningListPtr;
    }

/* Need to update the current running list to change ObjectListPtrHead
       that points to PTR2 to point to PTR1 */
    RunningPtr = FirstCurRunningListPtr;
    while (RunningPtr->NextRunningListPtr != NULL)
    {
        if (RunningPtr->ObjectListPtrHead == Object2Ptr)
```

```
              RunningPtr->ObjectListPtrHead = Object1Ptr;
          RunningPtr = RunningPtr->NextRunningListPtr;
      }
      /* Need to update the ObjectPtr table to change ObjectListPtrHead
         that points to PTR2 to point to PTR1 */
      TempObjectPtr = ObjectPtr;
      for (Count = 0; Count < ObjectCounter; Count++)
      {
          if (*TempObjectPtr == Object2Ptr)
              *TempObjectPtr = Object1Ptr;
          TempObjectPtr++;
      }
  }
}
```

```
/******************************************************************
 *                                                                *
 *  PROCEDURE TITLE: DisplayResults                               *
 *                                                                *
 *  AUTHOR: LOUIS J. BEATO                                        *
 *  DATE:   10/29/87                                              *
 *                                                                *
 *  MODIFICATION HISTORY:                                         *
 *                                                                *
 *  PURPOSE: The purpose of this procedure is to interpret the results of *
 *           the object list.                                     *
 *                                                                *
 *  CALLING SEQUENCE: DisplayResults (FirstObjectListPtr,         *
 *                          LineBufPtr);                          *
 *                                                                *
 *  OPERATIONAL DETAILS: Go thru the ObjectList and compute the following: *
 *                  - NumberOfPixels                              *
 *                  - Height                                      *
 *                  - Width                                       *
 *                  - Area                                        *
 *                  After the comuptations are made, the object will *
 *                  be deleted based on the following:            *
 *                  1. NumberOfPixels > (DPI * 10) or             *
 *                     NumberOfPixels < (DPI / 10)                *
 *                  2. HeightWidthRatio > 3.0                     *
 *                  3. HeightWidthRatio < 0.3                     *
 *                                                                *
 *                                                                *
 ******************************************************************/
DisplayResults (FirstObjectListPtr,
          LineBufPtr)

struct ObjectList *FirstObjectListPtr;
BOOLEAN *LineBufPtr[];
{
struct ObjectList *ObjectPtr, *NextObjectPtr;
unsigned int      ObjectCounter;
struct CoordList  *CoordListPtr;
long int          TotalNumberOfPixels;
int   MaxAllowedHeight;
```

```
int     MinAllowedHeight;
int     MaxAllowedWidth;
int     MinAllowedWidth;
int     MedianHeight;
int     MedianWidth;
int     I;

printf ("Gathering Object data\n");
   ObjectPtr = FirstObjectListPtr;
   /* Traverse through the object list */
   ObjectCounter = 0;
   while (ObjectPtr != NULL)
   {
      ObjectCounter++;
      if ((ObjectCounter % 500) == 0)
          printf ("...Working on object %d\n",ObjectCounter);
      ObjectPtr->NumberOfPixels = 0;
      ObjectPtr->Height    = 0;
      ObjectPtr->Width     = 0;
      ObjectPtr->Area      = 0;
      GetObjectParams (ObjectPtr,
                  &TotalNumberOfPixels);
      ObjectPtr->NumberOfPixels = TotalNumberOfPixels;

ObjectPtr = ObjectPtr->NextObjectListPtr;
   }
   printf ("There are %d total objects in the Object List\n",ObjectCounter);
   printf ("There are %d net objects in the Object List\n",
         TotalNumberOfObjectsCounter);

ObjectPtr = FirstObjectListPtr;
   OrderList (Height, TotalNumberOfObjectsCounter, &MedianHeight);
   OrderList (Width, TotalNumberOfObjectsCounter, &MedianWidth);

printf ("Median height is %d\n",MedianHeight);
   MaxAllowedHeight = MedianHeight + (int)((float)MedianHeight * 0.25);
   MinAllowedHeight = MedianHeight - (int)((float)MedianHeight * 0.25);

printf ("Median Width is %d\n",MedianWidth);
   MaxAllowedWidth = MedianWidth + (int)((float)MedianWidth * 0.25);
   MinAllowedWidth = MedianWidth - (int)((float)MedianWidth * 0.25);

printf ("BEGIN deleting objects\n");
   ObjectCounter = 0;
   while (ObjectPtr != NULL)
   {
      if (ObjectPtr->NumberOfPixels > (DPI * 10) ||
         ObjectPtr->NumberOfPixels < (DPI / 10))
      {
         DeleteObject (LineBufPtr,
                  ObjectPtr,
                  MinAllowedHeight,
                  MaxAllowedHeight,
                  MinAllowedWidth,
                  MaxAllowedWidth);
      }
```

```
        else if (ObjectPtr->HeightWidthRatio > 3.0)
        {
           DeleteObject (LineBufPtr,
                    ObjectPtr,
                    MinAllowedHeight,
                    MaxAllowedHeight,
                    MinAllowedWidth,
                    MaxAllowedWidth);
        }
        else if (ObjectPtr->HeightWidthRatio < 0.3)
        {
           DeleteObject (LineBufPtr,
                    ObjectPtr,
                    MinAllowedHeight,
                    MaxAllowedHeight,
                    MinAllowedWidth,
                    MaxAllowedWidth);
        }
        ObjectPtr = ObjectPtr->NextObjectListPtr;
     }
}
```

```
/****************************************************************
*                                                               *
*  PROCEDURE TITLE: DeleteObject                                *
*                                                               *
*  AUTHOR: LOUIS J. BEATO                                       *
*  DATE:   10/29/87                                             *
*                                                               *
*  MODIFICATION HISTORY:                                        *
*                                                               *
*  PURPOSE: The purpose of this procedure is to delete the appropriate *
*           object.                                             *
*                                                               *
*  CALLING SEQUENCE: DeleteObject (LineBufPtr,                  *
*                           ObjectPtr,                          *
*                           MinAllowedHeight,                   *
*                           MaxAllowedHeight,                   *
*                           MinAllowedWidth,                    *
*                           MaxAllowedWidth);                   *
*                                                               *
*  OPERATIONAL DETAILS: Scan thru the Object and its connections. If any *
*           of the connections pass the min/max height and      *
*           width criteria, the object is extracted from the    *
*           delete list. Else the object is then deleted from   *
*           the image.                                          *
*                                                               *
*****************************************************************/
DeleteObject (LineBufPtr,
         ObjectPtr,
         MinAllowedHeight,
         MaxAllowedHeight,
         MinAllowedWidth,
         MaxAllowedWidth)
BOOLEAN *LineBufPtr[];
struct ObjectList *ObjectPtr;
int MinAllowedHeight, MaxAllowedHeight;
```

```c
int MinAllowedWidth, MaxAllowedWidth;
{
int    Row, Col, ObjectCounter, Total[256], I;
BOOLEAN  *TempPtr;
struct  ObjectList  *NextObjectPtr;
long   int         NumberOfCoords;
struct  CoordList  *CoordListPtr;
int    Count;

/* Traverse through the object list */
   NumberOfObjectsDeleted++;

/* Look through all the objects connected with this one */
   while (ObjectPtr != NULL)
   {
      /* Check each element of the Object to see if there are
      characters embedded in there */
      if ((ObjectPtr->Height < MinAllowedHeight ||
         ObjectPtr->Height > MaxAllowedHeight ||
         ObjectPtr->Width  < MinAllowedWidth  ||
         ObjectPtr->Width  > MaxAllowedWidth) ||
         ObjectPtr->PixelPercent < 0.10)
      {
         /* Keep track of the number of Coordinates */
         CoordListPtr = ObjectPtr->FirstCoordListPtr;
         while (CoordListPtr != NULL)
         {
            for (Count = 0; Count < CoordListPtr->Length; Count++)
            {
               LineBufPtr[CoordListPtr->StartRow]
                     [CoordListPtr->StartCol + Count] = 0;
            }
            CoordListPtr = CoordListPtr->NextCoordListPtr;
         }
      }
      ObjectPtr = ObjectPtr->ObjectConnectListPtr;
   }
}
```

```
/*****************************************************************
*                                                                *
*  PROCEDURE TITLE: OrderObjectPtrList                           *
*                                                                *
*  AUTHOR: LOUIS J. BEATO                                        *
*  DATE:  10/29/87                                               *
*                                                                *
*  MODIFICATION HISTORY:                                         *
*                                                                *
*  PURPOSE: The purpose of this procedure is to order the ObjectList in *
*           a lowest to highest value order.                     *
*                                                                *
*  CALLING SEQUENCE: OrderObjectPtrList (ObjectPtr,              *
*                          ObjectCounter);                       *
*                                                                *
*  OPERATIONAL DETAILS: Simple sort.                             *
*                                                                *
```

```
                                        */
OrderObjectPtrList (ObjectPtr,
                    ObjectCounter)
struct ObjectList *ObjectPtr[];
int    ObjectCounter;
{
int  Count1, Count2;
struct ObjectList *TempPtr;

for (Count1 = 0; Count1 < ObjectCounter; Count1++)
   {
      for (Count2 = 0; Count2 < (ObjectCounter-1); Count2++)
      {
         if (ObjectPtr[Count2 + 1] < ObjectPtr[Count2])
         {
            TempPtr = ObjectPtr[Count2];
            ObjectPtr[Count2] = ObjectPtr[Count2+1];
            ObjectPtr[Count2+1] = TempPtr;
         }
      }
   }
}

/****************************************************************
 *                                                              *
 *   PROCEDURE TITLE: OrderList                                 *
 *                                                              *
 *   AUTHOR: LOUIS J. BEATO                                     *
 *   DATE:   10/29/87                                           *
 *                                                              *
 *   MODIFICATION HISTORY:                                      *
 *                                                              *
 *   PURPOSE: The purpose of this procedure is to order the list in *
 *        a lowest to highest value order.                      *
 *                                                              *
 *   CALLING SEQUENCE: OrderList (Array,                        *
 *                                Count);                       *
 *                                                              *
 *   OPERATIONAL DETAILS: Simple sort.                          *
 *                                                              *
 *                                                              *
 ****************************************************************/
OrderList (InArray,
           NumberOfObjectsCounter,
           Median)
int   InArray[];
int   NumberOfObjectsCounter;
int   *Median;
{
int  Count1, Count2;
int  TempVar;

for (Count1 = 0; Count1 < NumberOfObjectsCounter; Count1++)
   {
      for (Count2 = 0; Count2 < (NumberOfObjectsCounter-1); Count2++)
```

```c
            {
            if (InArray[Count2 + 1] < InArray[Count2])
                {
                TempVar = InArray[Count2];
                InArray[Count2] = InArray[Count2+1];
                InArray[Count2+1] = TempVar;
                }
            }
        }
    *Median = InArray [(int)(NumberOfObjectsCounter/2)];
}
```

```
/*************************************************************
 *                                                           *
 *   PROCEDURE TITLE: OrderList                              *
 *                                                           *
 *   AUTHOR: LOUIS J. BEATO                                  *
 *   DATE:   10/29/87                                        *
 *                                                           *
 *   MODIFICATION HISTORY:                                   *
 *                                                           *
 *   PURPOSE: The purpose of this procedure is to order the list in   *
 *            a lowest to highest value order.               *
 *                                                           *
 *   CALLING SEQUENCE: OrderList (Array,                     *
 *                                Count);                    *
 *                                                           *
 *   OPERATIONAL DETAILS: Simple sort.                       *
 *                                                           *
 *                                                           *
 *************************************************************/
OrderList (InArray,
           NumberOfObjectsCounter,
           Median)
int  InArray[];
int  NumberOfObjectsCounter;
int  *Median;
{
int  Count1, Count2;
int  TempVar;

for (Count1 = 0; Count1 < NumberOfObjectsCounter; Count1++)
        {
        for (Count2 = 0; Count2 < (NumberOfObjectsCounter-1); Count2++)
            {
            if (InArray[Count2 + 1] < InArray[Count2])
                {
                TempVar = InArray[Count2];
                InArray[Count2] = InArray[Count2+1];
                InArray[Count2+1] = TempVar;
                }
            }
        }
    *Median = InArray [(int)(NumberOfObjectsCounter/2)];
}
```

```
/*************************************************************
 *                                                            *
 *   PROCEDURE TITLE: GetObjectParams                         *
 *                                                            *
 *   AUTHOR: LOUIS J. BEATO                                   *
 *   DATE:   10/29/87                                         *
 *                                                            *
 *   MODIFICATION HISTORY:                                    *
 *                                                            *
 *   PURPOSE: The purpose of this procedure is to calculate the required *
 *            object parameters.                              *
 *                                                            *
 *   CALLING SEQUENCE: GetObjectParams (ObjectPtr,            *
 *                          TotalNumberOfPixels);             *
 *                                                            *
 *   OPERATIONAL DETAILS: For the Object (and its connections) calculate: *
 *             1. NumberOfPixels                              *
 *             2. Width                                       *
 *             3. Height                                      *
 *             4. Area                                        *
 *             5. HeightWidthRatio                            *
 *             6. PixelPercent                                *
 *                                                            *
 *************************************************************/
GetObjectParams(ObjectPtr,
          TotalNumberOfPixels)
struct ObjectList *ObjectPtr;
long  int    *TotalNumberOfPixels;
{
struct  CoordList   *CoordListPtr;
int   NumberOfPixels, EndCol, StartCol, EndRow, StartRow;
int   Counter;
struct  ObjectList  *StartObjectPtr;

StartObjectPtr = ObjectPtr;
   *TotalNumberOfPixels = 0;
   /* Look through all the objects connected with this one */
   while (ObjectPtr != NULL)
   {
      StartCol = 5000;
      EndCol  = 0;
      StartRow = 5000;
      EndRow = 0;
      NumberOfPixels = 0;
      /* Keep track of the number of Coordinates */
      CoordListPtr = ObjectPtr->FirstCoordListPtr;
      StartRow = CoordListPtr->StartRow;

while (CoordListPtr != NULL)
      {
         NumberOfPixels = NumberOfPixels + CoordListPtr->Length;
         *TotalNumberOfPixels = *TotalNumberOfPixels + CoordListPtr->Length;

if (CoordListPtr->StartCol < StartCol)
            StartCol = CoordListPtr->StartCol;
         if ((CoordListPtr->StartCol + CoordListPtr->Length) > EndCol)
```

```
    EndCol = CoordListPtr->StartCol + CoordListPtr->Length;

EndRow = CoordListPtr->StartRow;
    CoordListPtr = CoordListPtr->NextCoordListPtr;
}

ObjectPtr->NumberOfPixels = NumberOfPixels;
ObjectPtr->Width = EndCol - StartCol;
ObjectPtr->Height = EndRow - StartRow + 1;
ObjectPtr->Area = (long)ObjectPtr->Width * (long)ObjectPtr->Height;

ObjectPtr->HeightWidthRatio = (float)ObjectPtr->Height /
                              (float)ObjectPtr->Width;

ObjectPtr->PixelPercent = (float)ObjectPtr->NumberOfPixels /
                          (float)ObjectPtr->Area;

/* This will be used to determine the median height */
if (ObjectPtr->Height > 10)
{
    Height[TotalNumberOfObjectsCounter]   = ObjectPtr->Height;
    Width [TotalNumberOfObjectsCounter++] = ObjectPtr->Width;
}
ObjectPtr = ObjectPtr->ObjectConnectListPtr;
    }
}
```

What is claimed is:

1. A system for removing non-text, graphical or background information from a digitized image of pixels organized by rows and columns, said image including text characters, said system comprising:

means for computing the length of each run of contiguous ones of said pixels characterized by a first value and for computing the proportion of pixels characterized by said first value in the corresponding one of said rows or said columns in which said run resides; and run length removal means for removing from said image each run for which the combination of both said length and said proportion exceed predetermined criteria indicative of non-text information wherein said means for removing comprises means for defining a curve in a plane having first and second axes for said length and said proportion respectively, whereby said length and said proportion specify a location in said plane corresponding to the value of said proportion and the value of said length, respectively, wherein said means for removal removes said run if said location is not bounded between said curve and said axes.

2. The system of claim 1 wherein said image is a bi-tonal image in which each of said pixels has a value which is either "on" or "off", wherein said first value is "on" and wherein said means for removing changes the value of each pixel in any run which is to be removed from "on" to "off".

3. The system of claim 1 wherein said curve is a hyperbola characterized by a hyperbolic constant C, whereby said means for removal removes said run from said image if the product of said length and said proportion exceed C.

4. The system of claim 1 wherein said means for removing removes said run upon any of the following being true:

(a) said length is greater than a predetermined threshold length and said proportion is greater than a predetermined threshold proportion; or (b) said length is greater than n × said predetermined threshold length, where n is a real number; or (c) said proportion is greater than m × said predetermined threshold proportion, where m is a real number.

5. The system of claim 4 wherein said predetermined threshold length is the minimum length of lines which are to be removed from said image, said predetermined threshold proportion is 35%, n=2 and m=2.

6. A system for removing non-text, graphical or background information from a digitized image of pixels organized by rows and columns, said image including text characters, said system comprising:

object detection means for detecting in said image distinct objects, each of said distinct objects comprising plural connected pixels;

connection detection means for detecting whenever two of said distinct objects are connected to one another as smaller sub-objects comprising a larger object;

object removal means for computing the size of each of said objects and for removing from said image any one of said objects whose size is greater than a predetermined threshold size; and sub-object restoration means, operative whenever an object removed by said object removal means comprises plural sub-objects, for computing one or more statistical comparison parameters for said plural sub-objects and comparing them with one or more statistical base parameters of an ensemble of the objects in said image, and for restoring to said image any of said plural sub-objects whose comparison parameters are within a predetermined similitude to said statistical base parameters.

7. The system of claim 6 wherein said comparison parameters comprise the approximate height and area of each sub-object and said base parameters comprise the approximate median height and approximate median area of all of the objects detected in said image.

8. The system of claim 7 wherein said predetermined similitude is 35% of said median height and 70% of said median area.

9. The system of claim 6 wherein:
said image is a binary image such that each of said pixels has a value which is either "on" or "off";
said object removal means changes the value of each pixel in an object which is to be removed from "on" to "off"; and
said sub-object restoration means changes the value of each pixel in a sub-object which is to be restored to said image from "off" to "on".

10. The system of claim 6 wherein said object removal means further removes from said image any object whose size is less than a predetermined minimum size threshold.

11. The system of claim 1 wherein said run length removal means produces a run length processed image, said system further comprising connected component analysis means for processing said run length processed image, said connected component analysis means comprising:
object detection means for detecting in said image distinct objects, each of said distinct objects comprising plural connected pixels,
connection detection means for detecting whenever two of said distinct objects are connected to one another as smaller sub-objects comprising a larger object,
object removal means computing the size of each of said objects and for removing from said image any one of said objects whose size is greater than a predetermined threshold size, and
sub-object restoration means, operative whenever an object removed by said object removal means comprises plural sub-objects, for computing one or more statistical comparison parameters for said plural sub-objects and comparing them with one or more statistical base parameters of an ensemble of the objects in said image, and for restoring to said image any of said plural sub-objects whose comparison parameter are within a predetermined similitude to said statistical base parameters.

12. The system of claim 11 wherein said comparison parameters comprise the approximate height and area of each sub-object and said base parameters comprise the approximate median height and approximate median area of all of the objects detected in said image.

13. The system of claim 12 wherein said predetermined similitude is 35% of said median height and 70% of said median area.

14. The system of claim 11 wherein said object removal means comprises means for removing from said image any object whose size is less than a predetermined minimum threshold size.

15. A method for removing non-text, graphical or background information from a digitized image of pixels organized by rows and columns, said image including text characters, said method comprising:
computing the length of each run of contiguous ones of said pixels characterized by a first value and computing the proportion of pixels characterized by said first value in the corresponding one of said rows or said columns in which said run resides; and
removing from said image each run for which the combination of both said length and said proportion exceed predetermined criteria indicative of non-text information wherein the step of removing comprises:
defining a curve in a plane having first and second axes for said length and said proportion respectively, whereby said length and said proportion specify a location in said plane corresponding to the value of said length and the value of said proportion, respectively; and removing said run if said location is not bounded between said curve and said axes.

16. The method of claim 15 wherein said image is a bi-tonal image in which each of said pixels has a value which is either "on" or "off", wherein said first value is "on" and wherein the step of removing comprises changing the value of each pixel in any run which is to be removed from "on" to "off".

17. The method of claim 15 wherein said curve is a hyperbola characterized by a hyperbolic constant C, whereby the step of removing comprises removing said run from said image if the product of said length and said proportion exceed C.

18. The method of claim 15 wherein the step of removing comprises removing said run if any of the following are true:
(a) said length is greater than a predetermined threshold length and said proportion is greater than a predetermined threshold proportion; or
(b) said length is greater than n× said predetermined threshold length, where n is a real number; or
(c) said proportion is greater than m× said predetermined threshold proportion, where m is a real number.

19. The method of claim 18 wherein said predetermined threshold length is the minimum length of lines which are to be removed from said image, said predetermined threshold proportion is 35%, n=2 and m=2.

20. A method for removing non-text, graphical or background information from a digitized image of pixels organized by rows and columns, said image including text characters, said method comprising:
first detecting in said image distinct objects, each of said distinct objects comprising plural connected pixels;
second detecting whenever two of said distinct objects are connected to one another as smaller sub-objects comprising a larger object;
computing the size of each of said objects and removing from said image any one of said objects whose size is greater than a predetermined threshold size; and
if an object removed by the removing step comprises plural sub-objects, computing one or more statistical comparison parameters for said plural sub-objects and comparing them with one or more statistical base parameters of an ensemble of the objects in said image, and restoring to said image any of said plural sub-objects whose comparison parameters are within a predetermined similitude to said statistical base parameters.

21. The method of claim 20 wherein said comparison parameters comprise the approximate height and area of each sub-object and said base parameters comprise the approximate median height and approximate median area of all of the objects detected in said image.

22. The method of claim 21 wherein said predetermined similitude is 35% of said median height and 70% of said median area.

23. The method of claim 20 wherein:
said image is a binary image such that each of said pixels has a value which is either "on" or "off";
the step of removing comprises changing the value of each pixel in an object which is to be removed from "on" and "off"; and
the step of restoring comprises changing the value of each pixel in a sub-object which is to be restored to said image from "off" to "on".

24. The method of claim 20 wherein the step of removing further comprises removing from said image any object whose size is less than a predetermined minimum size threshold.

25. The method of claim 15, further comprising the steps of:
first detecting in said image distinct objects, each of said distinct objects comprising plural connected pixels;
second detecting whenever two of said distinct objects are connected to one another as smaller sub-objects comprising a larger object;
computing the size of each of said objects and removing from said image any one of said objects whose size is greater than a predetermined threshold size; and
if an object removed by the removing step comprises plural sub-objects, computing one or more statistical comparison parameters for said plural sub-objects and comparing them with one or more statistical base parameters of an ensemble of the objects in said image, and restoring to said image any of said plural sub-objects whose comparison parameters are within a predetermined similitude to said statistical base parameters.

26. The method of claim 25 wherein said comparison parameters comprise the approximate height and area of each sub-object and said base parameters comprise the approximate median height and approximate median area of all of the objects detected in said image.

27. The method of claim 26 wherein said predetermined similitude is 35% of said median height and 70% of said median area.

28. The method of claim 25 wherein:
said image is a binary image such that each of said pixels has a value which is either "on" or "off";
the step of removing objects comprises changing the value of each pixel in an object which is to be removed from "on" to "off"; and
the step of restoring comprises changing the value of each pixel in a sub-object which is to be restored to said image from "off" to "on".

29. The method of claim 25 wherein the step of removing further comprises removing from said image any object whose size is less than a predetermined minimum size threshold.

* * * * *